United States Patent
Bermes

(10) Patent No.: US 8,985,664 B2
(45) Date of Patent: Mar. 24, 2015

(54) CARGO BED STAKE POCKET ADAPTED FOR SECURING J-HOOK STRAP THERETO

(71) Applicant: Steven P. Bermes, Fort Wayne, IN (US)

(72) Inventor: Steven P. Bermes, Fort Wayne, IN (US)

(73) Assignee: Novae Corporation, Markle, IN (US)

(*) Notice: Subject to any disclaimer, the term of this patent is extended or adjusted under 35 U.S.C. 154(b) by 0 days.

(21) Appl. No.: 13/928,726

(22) Filed: Jun. 27, 2013

(65) Prior Publication Data

US 2014/0375080 A1    Dec. 25, 2014

Related U.S. Application Data

(63) Continuation-in-part of application No. 13/924,003, filed on Jun. 21, 2013.

(51) Int. Cl.
*B60P 7/08* (2006.01)

(52) U.S. Cl.
CPC .................................. *B60P 7/0807* (2013.01)
USPC ............................. 296/43; 410/116; 410/106

(58) Field of Classification Search
CPC ...................... B62D 33/0207; B62D 33/0215
USPC .......... 296/43, 32, 36, 40, 42, 11; 410/97, 116, 410/101, 103, 106, 108; 24/265 CD
See application file for complete search history.

(56) References Cited

U.S. PATENT DOCUMENTS

| 335,918 | A | * | 2/1886 | Gould | 296/43 |
| 887,258 | A | * | 5/1908 | Louden | 296/9 |
| 4,650,382 | A | * | 3/1987 | Johnson | 410/110 |
| 7,334,972 | B2 | * | 2/2008 | Cash | 410/98 |
| 2009/0041557 | A1 | * | 2/2009 | Lin | 410/97 |

* cited by examiner

*Primary Examiner* — Dennis H Pedder
(74) *Attorney, Agent, or Firm* — George Pappas

(57) ABSTRACT

Stake pocket formations are secured to a cargo bed frame of a land vehicle such as trailers and flatbed trucks for removably supporting sidewall supporting members. The formations include sidewalls secured to and projecting from the frame and an end wall extending between the sidewalls. An opening extends through the end wall and is adapted to receive the terminal end of a J-hook therethrough. The J-hook is secured to the formation by inserting the terminal end thereof into the pocket placing an upper edge of the end wall into the J-hook gap and rolling/rotating the J-hook thereby inserting the terminal end into the opening. The J-hook cannot be removed from the pocket unless it is rolled/rotated in the opposite direction. While within the stake pocket and without strap tension, the J-hook abuts the trailer frame and formation end wall and is, thereby, maintained within the pocket.

26 Claims, 24 Drawing Sheets

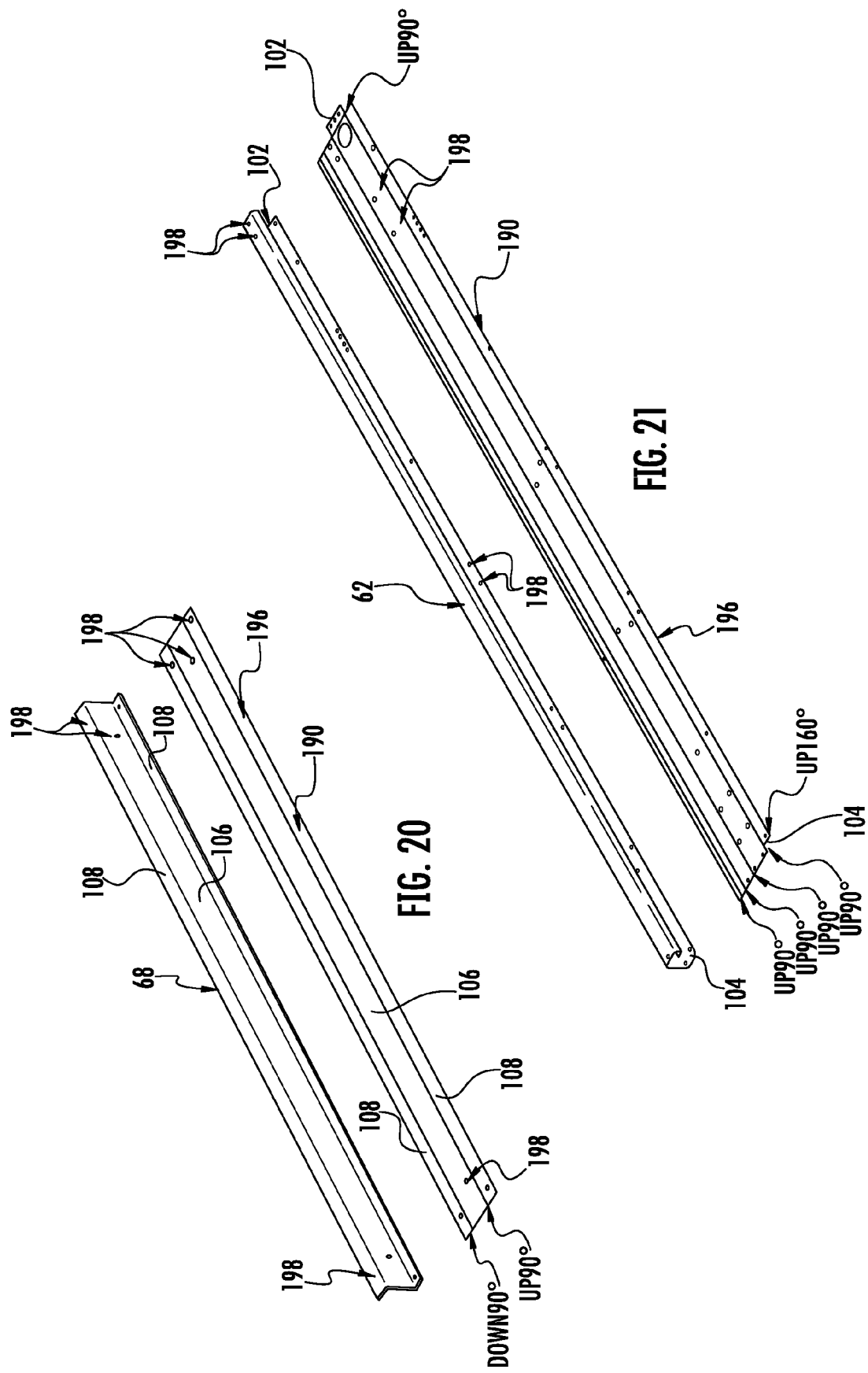

CARGO BED STAKE POCKET ADAPTED FOR SECURING J-HOOK STRAP THERETO

CROSS REFERENCE TO RELATED APPLICATIONS

This is a continuation-in-part application of U.S. patent application Ser. No. 13/924,003 filed on Jun. 21, 2013, the disclosure of which is hereby incorporated herein by reference.

BACKGROUND OF THE INVENTION

1. Field of the Invention

The present invention relates to the field of cargo beds of land vehicles such as trailers and flatbed trucks. More particularly, the present invention relates to an improved stake pocket formation used on a cargo bed of land vehicles which is adapted both to receive and support a sidewall supporting member and to attach a J-hook strap thereto.

2. Background

Trailers are today commonly used by pivotally attaching to and being pulled behind land vehicles for hauling all sorts of cargo. Flatbed trucks are similarly used for hauling all sorts of cargo. The trailers and flatbed trucks include a frame or chassis that forms a cargo bed upon which the cargo is loaded and hauled as needed. Sidewalls are often provided and secured along the perimeter of the cargo bed for hauling, for example, bulk materials. When hauling items such as all-terrain vehicles (ATVs), tractors, etc., it is desirable to remove the sidewalls and simply secure such items to the cargo bed with ratchet straps including, for example, straps having J-hooks at their terminal ends.

For selectively securing and removing the sidewalls from the cargo bed, stake pockets can be provided along the perimeter of the cargo bed. Sidewall supporting members such as 2×4 wood stakes are received in and are vertically supported by the stake pockets. The sidewalls are secured to the sidewall supporting members and are, thus, removably secured to the perimeter of the cargo bed.

SUMMARY OF THE INVENTION

The object of the present invention is to provide an improved stake pocket formation which is capable of receiving and supporting a sidewall supporting member and which also includes means for easily and reliably securing the J-hook of a strap thereto. With the improved stake pocket formation the cargo bed sidewalls can be selectively removably secured to the perimeter of the cargo bed and, when the sidewall supporting member is removed therefrom, the J-hook of a strap can easily and reliably be secured thereto.

In one form thereof the present is directed to a combination comprising a cargo bed, a frame supporting the cargo bed and wheels rotatably secured to the frame and a plurality of stake pocket formations. Each formation includes a pocket adapted to receive a sidewall supporting member. Each stake pocket formation includes a pair of sidewalls secured to and projecting from the frame and an end wall extending between the pair of sidewalls. An opening extends through each formation end wall and is adapted to receive a terminal end of a J-hook therethrough, whereby a strap having a J-hook at its terminal end may be secured to the stake pocket formations.

Preferably, the end walls include an upper edge, the opening is defined by side edges separated by a distance of 1.2 to 2.0 inches, and the opening side edges are located at least 0.6 to 1.4 inch below the end wall upper edge.

A J-hook is secured to the formation by inserting the terminal end thereof into the pocket placing the upper edge into a gap of the J-hook located between a J-hook shank and fingers and rolling the J-hook and inserting the terminal end thereof through the opening. An overall width of the J-hook is greater than a width of the pocket whereby, when a J-hook is located within the pocket and the J-hook strap is not in tension, the J-hook is supported and maintained within the formation.

Preferably, each stake pocket formation further includes an attachment wall extending from each of the sidewalls, and the attachment walls are attached to the frame whereby the sidewalls are secured thereto. The formation attachment walls, sidewalls and end wall are integrally formed with one another.

Also preferably, the formation sidewalls project from the frame a distance slightly greater than about 1.5 inch and the end walls extend between the sidewalls a distance slightly greater than about 3.5 inches, whereby the stake pockets are rectangular and are slightly greater than about 1.5 inch by about 3.5 inches.

In another form thereof, the present invention is directed to a stake pocket formation attachable to a frame along a perimeter of a cargo bed for forming a stake pocket for receiving a sidewall supporting member. The stake pocket formation includes an end wall extending between a pair of sidewalls. The sidewalls are attachable to the frame for thereby forming a pocket for receiving a sidewall supporting member. An opening extends through the end wall and is adapted to receive the terminal end of a J-hook therethrough, whereby a strap having a J-hook at its terminal end may be secured to said stake pocket formation.

Preferably, the end wall includes an upper edge, the opening is defined by side edges separated by a distance of 1.2 to 2.0 inches, and the opening side edges are located at least 0.6 to 1.4 inch below the end wall upper edge.

A J-hook is secured to the formation by inserting the terminal end thereof into the pocket placing the upper edge into a gap of the J-hook located between a J-hook shank and fingers and rolling the J-hook and inserting the terminal end thereof through the opening. An overall width of the J-hook is greater than a width of the pocket whereby, when a J-hook is located within the pocket and the J-hook strap is not in tension, the J-hook is supported and maintained within the formation.

Preferably, an attachment wall extends from each of the sidewalls and the attachment walls include fastener holes adapted to receive a fastener for attaching the formation to the frame. The attachment walls, sidewalls and end wall are integrally formed with one another.

Also preferably, the formation sidewalls extend between their respective attachment wall and the end wall a distance slightly greater than about 1.5 inch and the end wall extends between the sidewalls a distance slightly greater than about 3.5 inches, whereby the formed stake pocket is rectangular and is slightly greater than about 1.5 inch by about 3.5 inches.

BRIEF DESCRIPTION OF THE DRAWINGS

The above mentioned and other features of this invention, and the manner of attaining them, will become more apparent and the invention itself will be better understood by reference to the following description of the embodiments of the invention taken in conjunction with the accompanying drawings, wherein:

FIG. 20 is a perspective view of an exemplary trailer frame crossbeam component depicted both before and after bending into a desired shape;

FIG. 21 is a perspective view of an exemplary trailer frame side beam component depicted both before and after bending into a desired shape;

Figure 1:
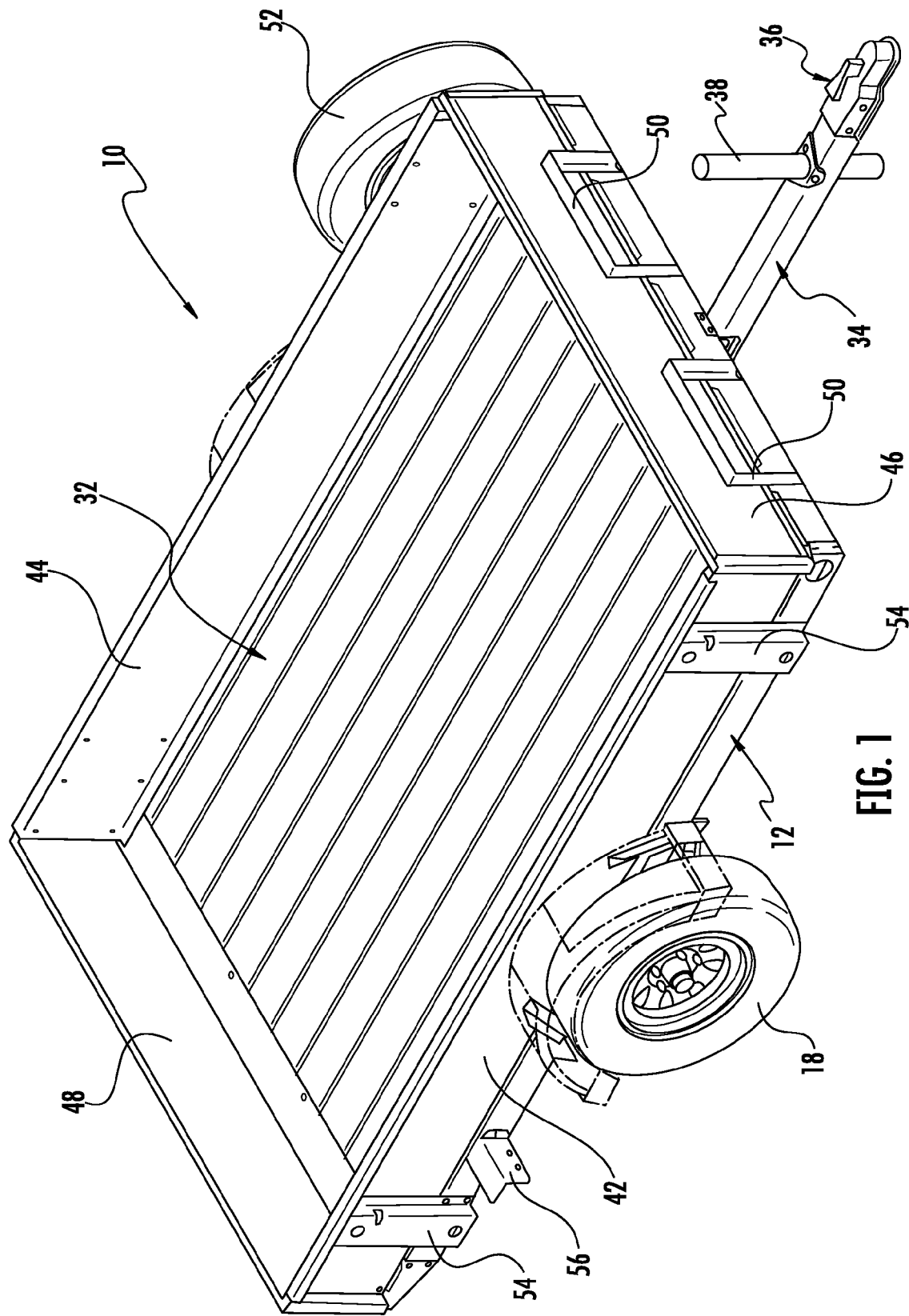
FIG. 1 is a perspective view of a trailer constructed of sheet metal in accordance with the principles of the present invention.

Corresponding reference characters indicate corresponding parts throughout several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION OF THE PREFERRED EMBODIMENTS

Figure 2:
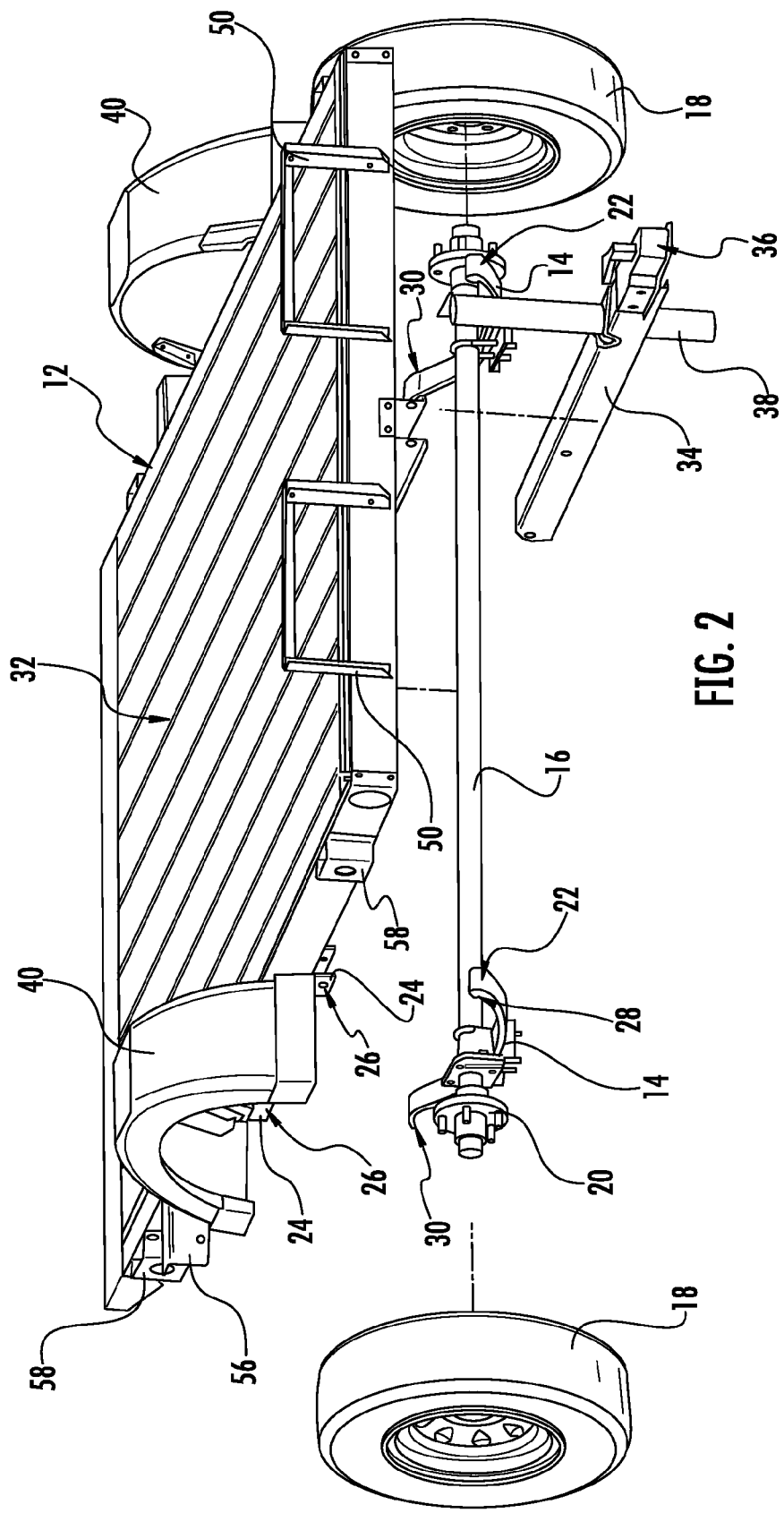
FIG. 2 is an exploded view of the frame, axle, wheels and tongue of the trailer shown in FIG. 1.
Figure 3:
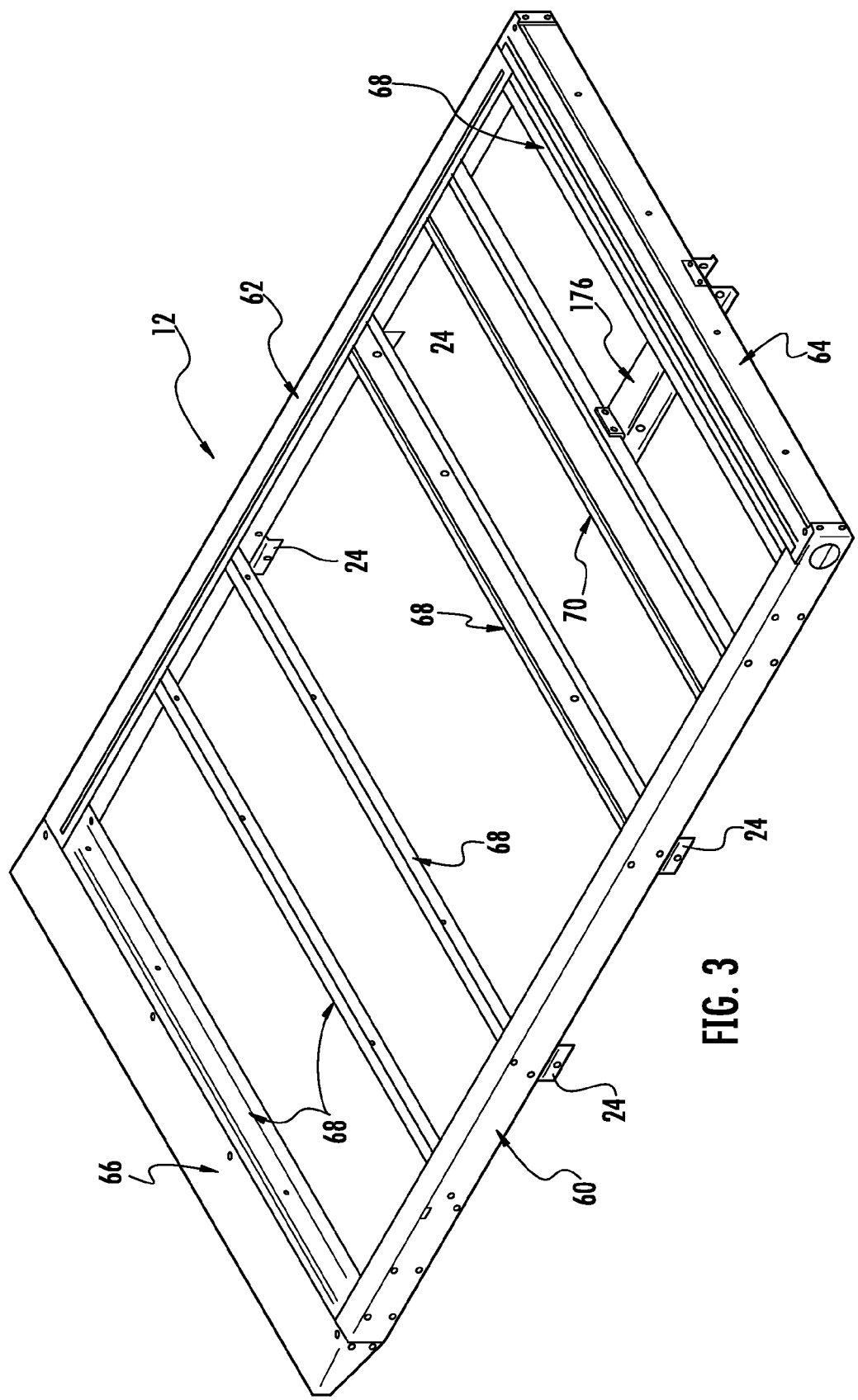
FIG. 3 is a top perspective view of the trailer frame shown in FIG. 2.
Figure 4:
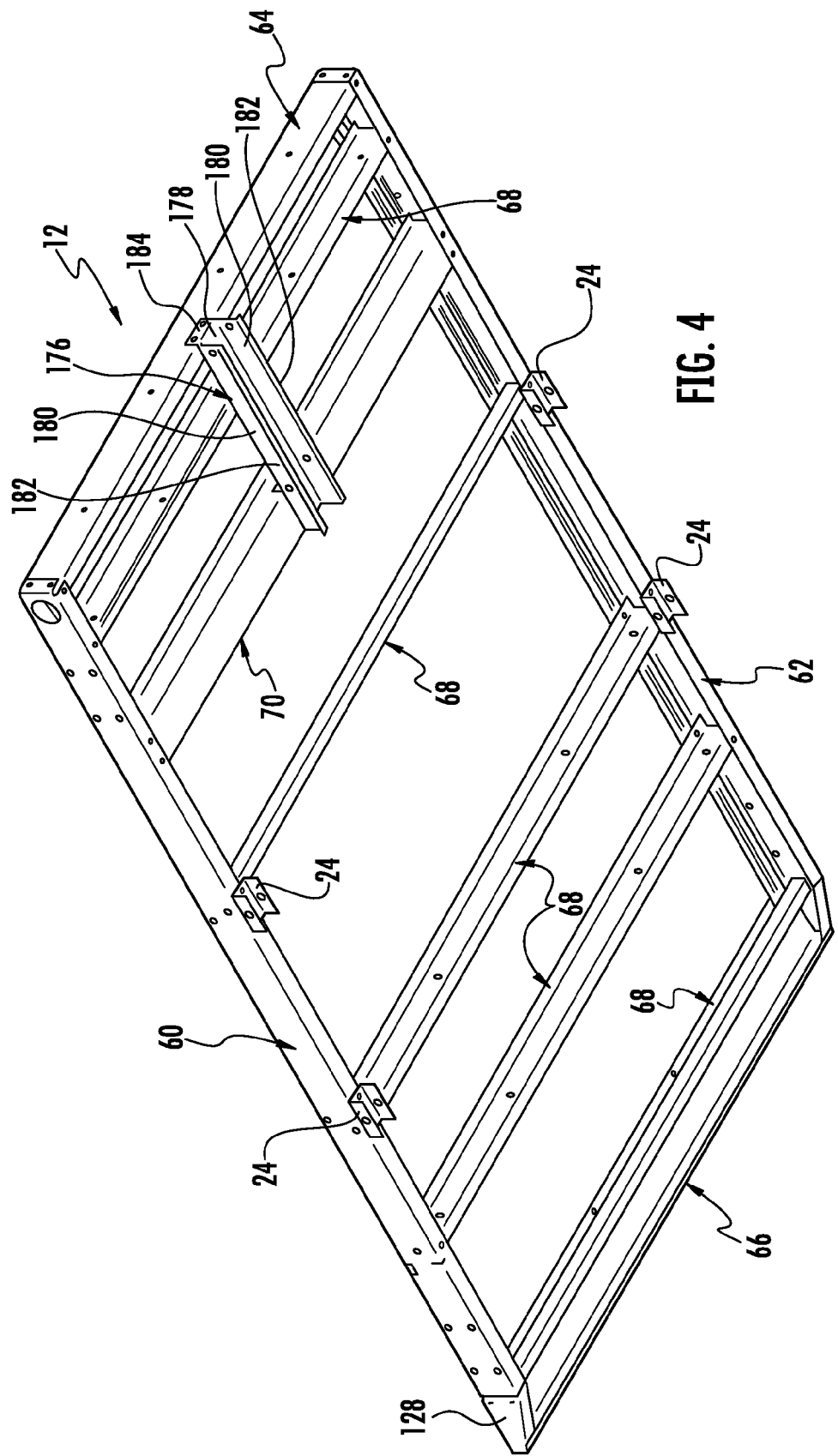
FIG. 4 is a bottom perspective view of the trailer frame shown in FIG. 2.
Figure 5:
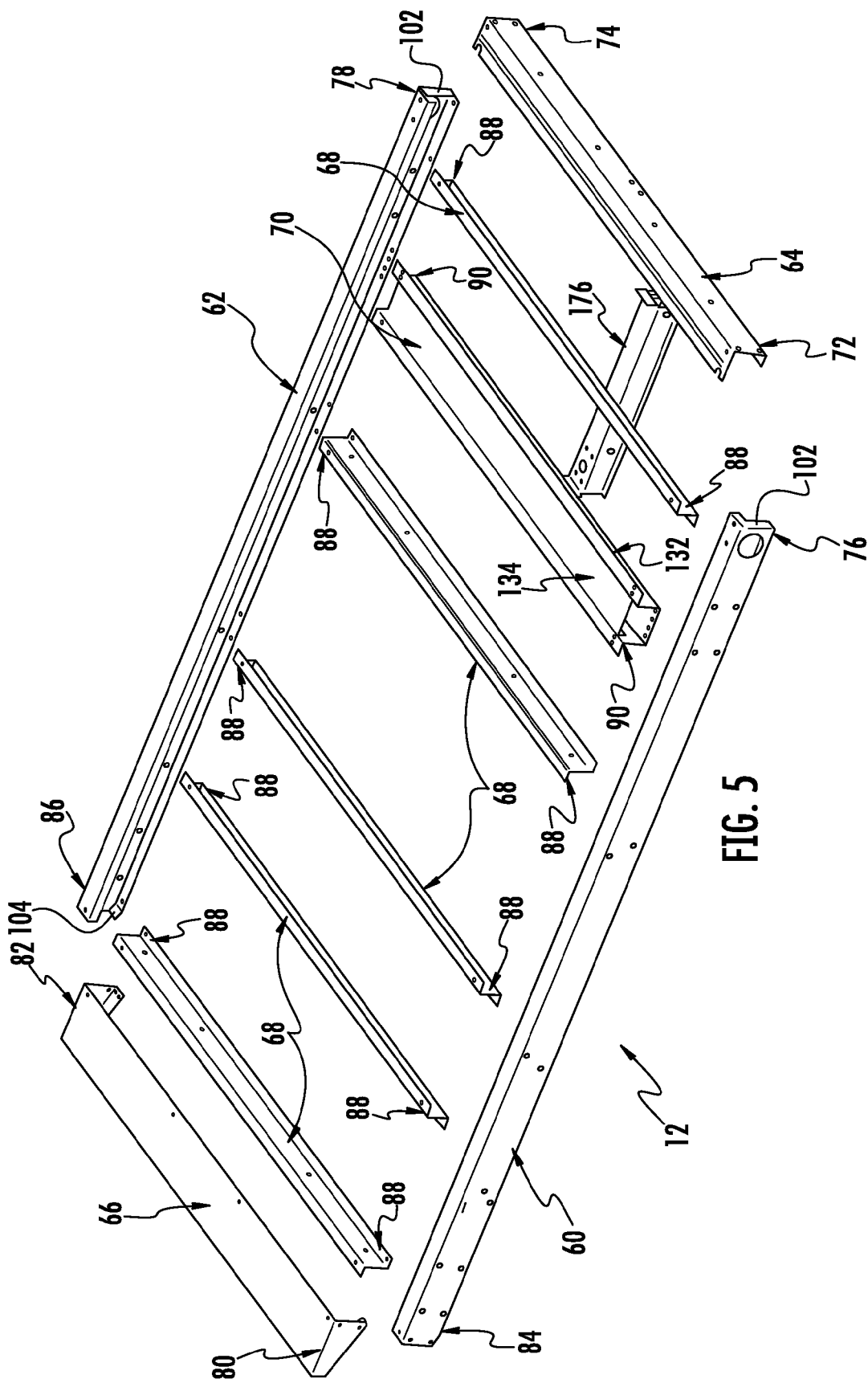
FIG. 5 is an exploded view of the trailer frame shown in FIG. 2 depicting the several components thereof.

Referring initially to FIGS. 1 and 2, a trailer constructed of structural components/members made of sheet metal in accordance with the principles of the present invention is shown and generally designated by the numeral 10. Trailer 10 includes a frame 12 which is supported by leaf suspension springs 14, axle 16 and wheels 18 rotatably secured to spindles 20 thereof in a known and customary manner. The forward end 22 of the leaf springs 14 are pivotally secured to U-shaped brackets 24 which are attached to the underside of the frame 12 by extending a bolt (not shown) through the holes 26 in the U-shaped brackets 24 and the hole 28 at the forward end 22 of the leaf springs 14. The rear end 30 of leaf springs 14 are secured to the underside of the frame 12 using similar U-shaped brackets 24 and bolts (not shown) extending through holes 26 thereof. However, the leaf springs rear end 30 is maintained within the U-shaped bracket with bolts (not shown) for thereby allowing the springs rear end 30 to longitudinally slide within the bracket as the leaf springs flex, for thereby transferring the weight from the trailer to the axle 16.

Frame 12 is adapted to support a trailer bed 32 preferably made of treated wood such as 5/4 inch decking or other standard timber materials. A tongue 34 is secured to the frame 12 and extends forwardly of the trailer 10. Tongue 34 includes a ball hitch coupling assembly 36 at its forward terminal end for detachably securing to a vehicle ball hitch (not shown) in a known and customary manner. An A-frame jack tube 38 is secured to the tongue 34 and is adapted to receive a standard gearbox and extension tube (not shown) for supporting and selectively raising and lowering the tongue 34 and, hence, the forward end of the trailer 10.

Trailer 10 can further include wheel fenders 40 secured to the frame 12 and positioned over the wheels 18. Lights brackets 56 are also secured to and extend outwardly from the frame 12 whereupon trailer lights (not shown) can be mounted.

Left and right sidewalls 42, 44, front wall 46 and rear tailgate 48 can also be provided and secured to the frame 12. The left and right sidewalls 42, 44 can be secured with sidewall supporting frame members 54 which are secured to and extend upwardly from the frame 12. A spare wheel 52 can be detachably secured to one of the sidewall supporting frame members 54.

As seen in FIG. 2 wherein the sidewalls, front wall and tailgate 42, 44, 46 and 48 have been omitted, wheels stops 50 can be provided at the forward end of the frame 12 for abutting the wheels of vehicles such as ATVs and lawn tractors being carried on the trailer 10 without a front wall 46. Combination stake pockets and strap securement members 58 can also be provided and secured to the frame 12. Securement members 58 are adapted to slidingly receive and support a 2×4 wood member in a position similar to sidewall supporting frame members 54 and securing other sidewalls thereto as may be desired. Advantageously, securement members 58 are also adapted for selectively attaching thereto double J-hooks of common ratchet straps.

Trailer frame 12 is made by assembling and securing together with rivets or other suitable fasteners: left and right side structural members 60, 62; front end structural member 64; rear end structural member 66; crossbeam members 68; and, torque tube 70. The left and right terminal ends 72, 74 of the front end structural member 64 are secured to the respective front terminal ends 76, 78 of the left and right side structural members 60, 62. The left and right terminal ends 80, 82 of the rear end structural member 66 are secured to the respective rear terminal ends 84, 86 of the left and right side structural members 60, 62. The crossbeam members 68 are secured, at their terminal ends 88, to and between the left and right side structural members 60, 62. The torque tube 70 is also similarly secured, at its terminal ends 90, to and between the left and right side structural members 60, 62. The front end structural number 64, rear end structural number 66, cross beam members 68 and the torque tube 70 are, hence, secured between and extend transverse to the left and right side structural members 60, 62.

Figure 9:
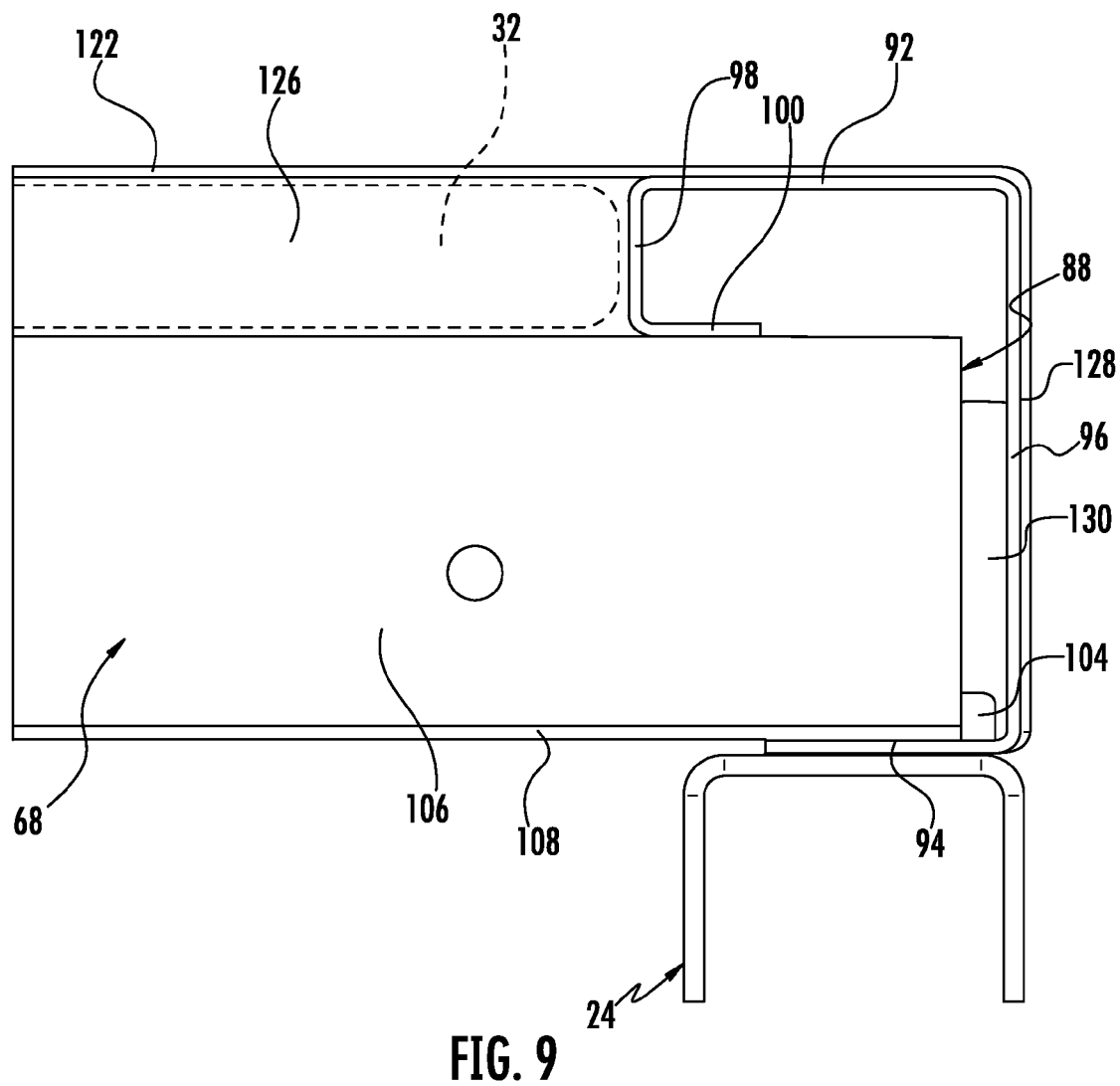
FIG. 9 is a cross-sectional view taken along line 9-9 of FIG. 6.

As best seen in FIG. 9, the left and right side structural members 60, 62, when viewed in cross-section, comprise: a U-shaped portion including a branch leg 92 and an attachment leg 94 integrally formed with and extending from a base section 96; and, an L-shaped portion including a branch leg 98 integrally formed with an attachment leg 100. The branch leg 92 of the U-shaped portion is integrally formed with the branch leg 98 of the L-shaped portion. At their front terminal ends 76, 78, the side structural members 60, 62 each include a tab 102 integrally formed with and extending generally perpendicular from their base section 96. At their rear terminal ends 84, 86, the side structural members 60, 62 each include an upwardly bent element 104 formed by cutting a V-notch 104 between the base section 96 and attachment leg 94 and bending the attachment leg 94 portion adjacent the V-notch at an angle from the attachment leg 94.

The crossbeam members 68 are generally Z-shaped in cross-section and comprise a central web section 106 and flange sections 108 which are integrally formed therewith and extend generally perpendicular from the central web section 106.

Figure 7:
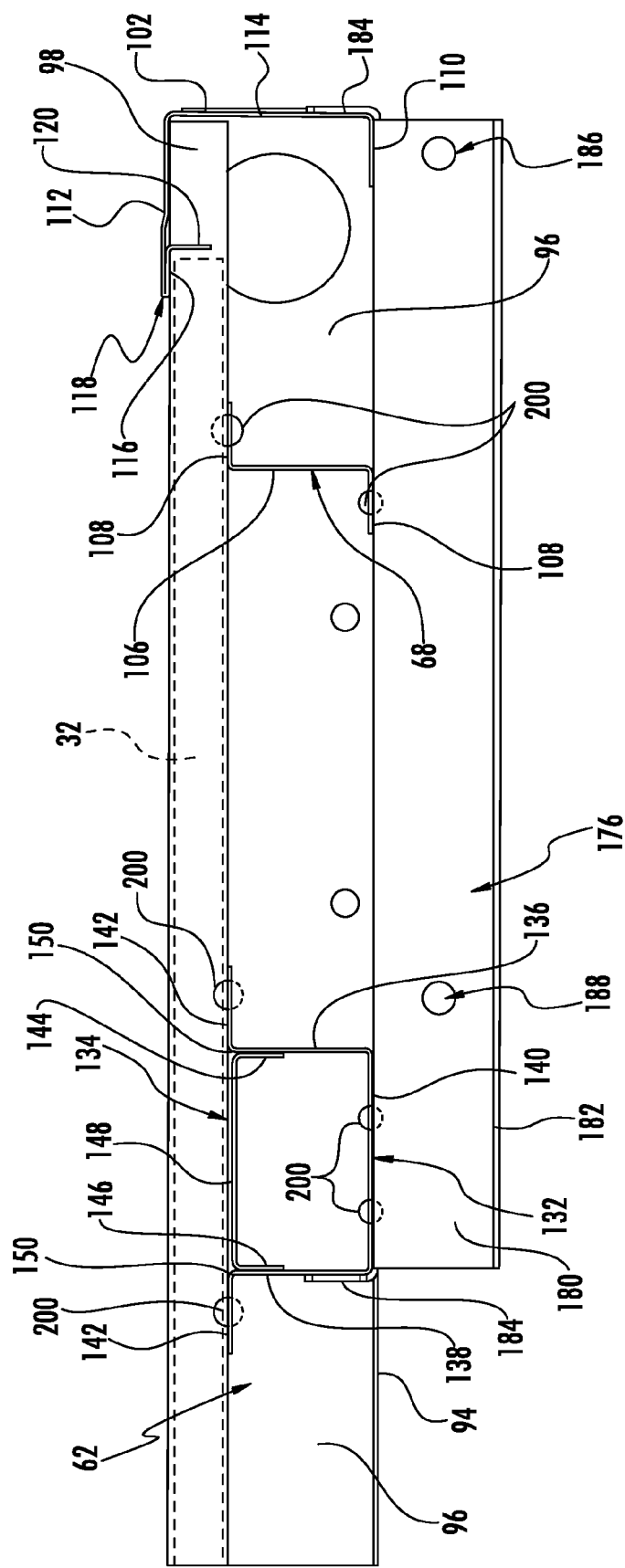
FIG. 7 is a cross-sectional view taken along line 7-7 of FIG. 6.
Figure 8:
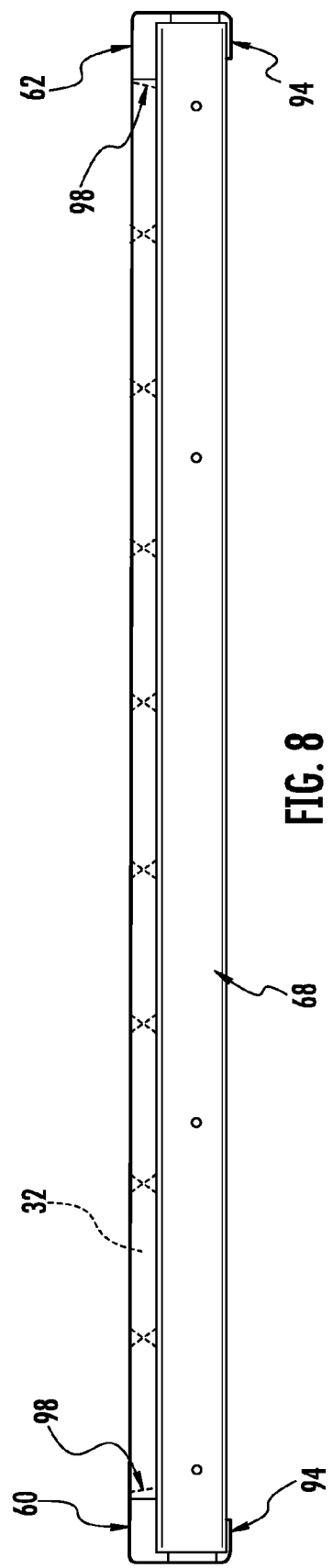
FIG. 8 is a cross-sectional view taken along line 8-8 of FIG. 6.
Figure 11:
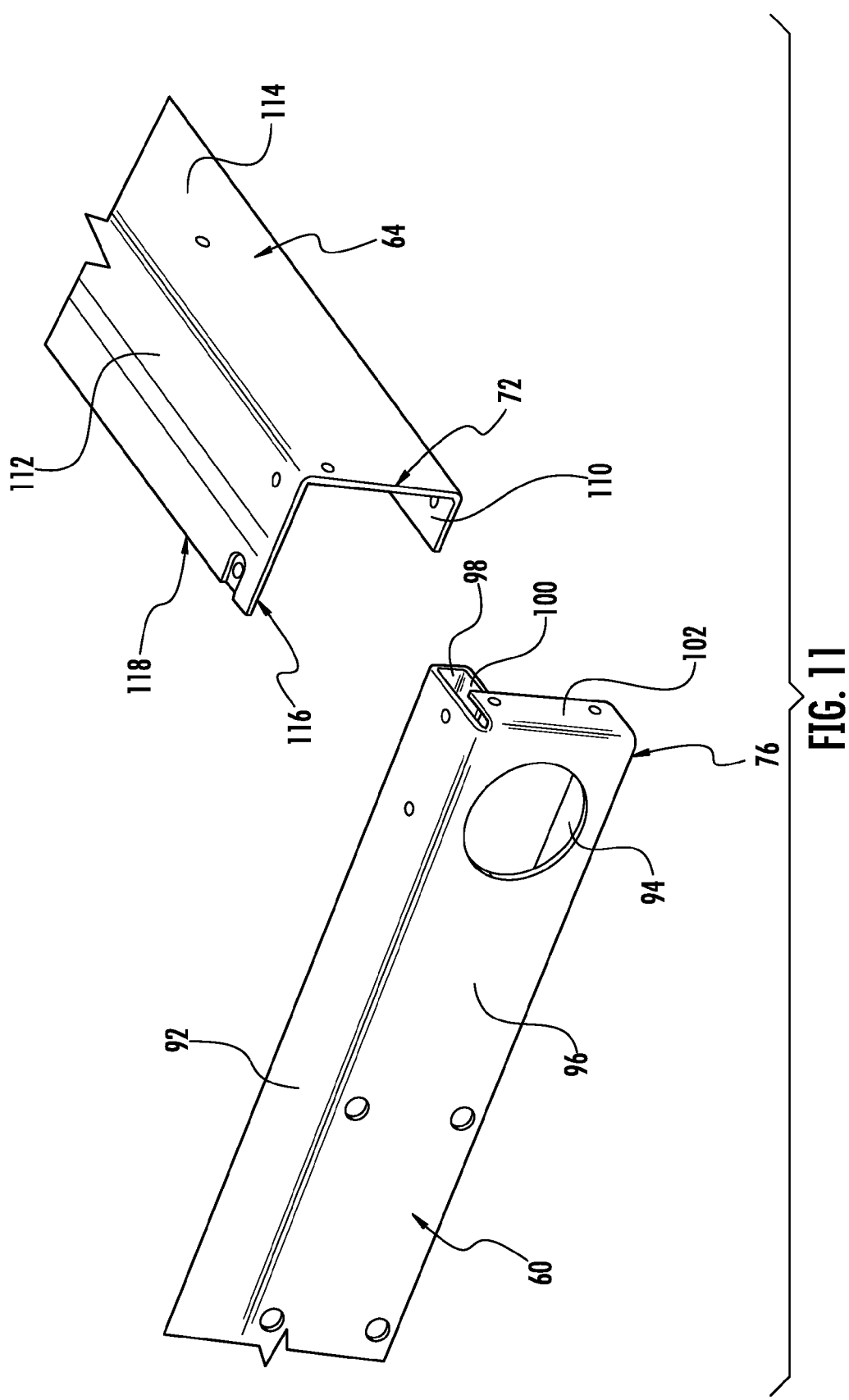
FIG. 11 is a partial perspective view of the side beam and front beam components of the trailer frame shown in FIG. 2 prior to assembly.

The front end structural member 64, in cross-section, is generally U-shaped having a lower leg 110 and an upper leg 112 integrally formed with and extending from a base section 114. The terminal portion of the upper leg 112 is bent over onto itself thereby forming an overlapping arrangement including an interior section 116 integrally formed with the upper leg 112 along a terminal edge 118. Upper leg 112 and interior section 116 are adjacent and parallel to one another. As best seen in FIG. 7, an abutment section 120 is integrally formed with the interior section 116 and extends generally perpendicular therefrom. The abutment section 120, as shown in FIG. 11, does not extend to the left and right terminal ends 72, 74 for thereby placing the terminal ends of the branch legs 92 parallel and adjacent the terminal ends of the upper leg 112 and securing to one another as further described hereinbelow.

Figure 10:
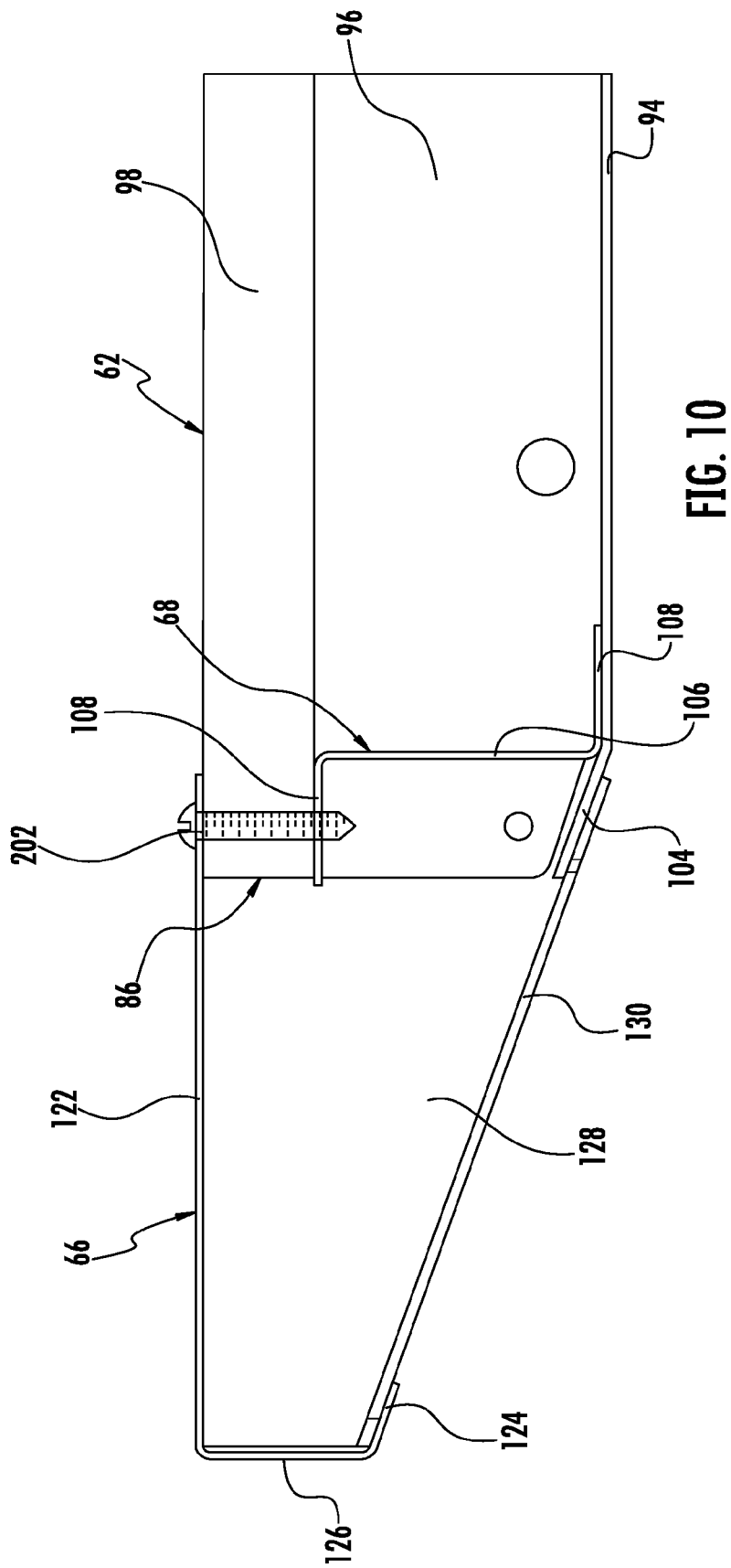
FIG. 10 is a cross-sectional view taken along line 10-10 of FIG. 6.

The rear end structural member 66, in cross-section, is also generally U-shaped and includes an upper panel 122 and toe panel 124 integrally formed with and extending from a rear panel 126. Upper panel 122 is generally perpendicular to the rear panel 126, whereas the toe panel 124 extends at an angle therefrom as best seen in FIG. 10. At each of the left and right terminal ends 80, 82, a side panel 128 is integrally formed with and extends generally perpendicular from the upper panel 122. A bottom side panel section 130 is integrally formed with and extends generally perpendicular from each of the side panels 128. Bottom side panel sections 130, as best seen in FIG. 10, extend at an angle relative to the upper panel 122 and are generally parallel with toe panel 124 and the upwardly bent elements 104 of the left and right side members 60, 62.

The torque tube 70, in cross-section, generally comprises a first U-shaped portion 132 nested and secured by welding with a second U-shaped portion 134. The first U-shaped portion 132 includes first and second legs 136, 138 extending from and integrally formed with a base section 140. Brim extensions 142 are integrally formed with and project generally perpendicular from the terminal ends of each of the first and second legs 136, 138. The second U-shaped portion 134 includes first and second legs 144, 146 extending from and integrally formed with a base section 148. As best seen in FIG. 7, the first U-shaped portion 134 is received within and nested in the second U-shaped portion 132 placing the first leg 136 of the first U-shaped portion 132 adjacent the first leg 144 of the second U-shaped portion 134 and placing the second leg 138 of the first U-shaped portion 132 adjacent the second leg 146 of the second U-shaped portion 148. U-shaped portions 132, 134 are secured to one another by welding as indicated by welding beads 150 located at the bends between the first and second legs 136, 138 and the brim extensions 142 and the bends between the first and second legs 144, 146 and the base section 148.

Referring now more particularly to FIGS. 13-17, in cross-section, the tongue 34 is tubular shaped and is made up of a rectangular component 152 having a longitudinal opening 154 and a flat sheet component 156 which fills the longitudinal opening 154 and is welded to the rectangular component 152. The rectangular component essentially comprises a U-shaped portion including sidewalls 158 integrally formed with and extending from a top wall 160. Flange sections 162 are integrally formed with and extend from the ends of the sidewalls 158 toward one another. Flange sections 162 are coplanar and the longitudinal opening 154 is located therebetween. The sheet component 156 is secured to the flange sections 162 by welding as indicated by welding beads 164 located at the terminal edges of the flange sections 162.

Figure 16:
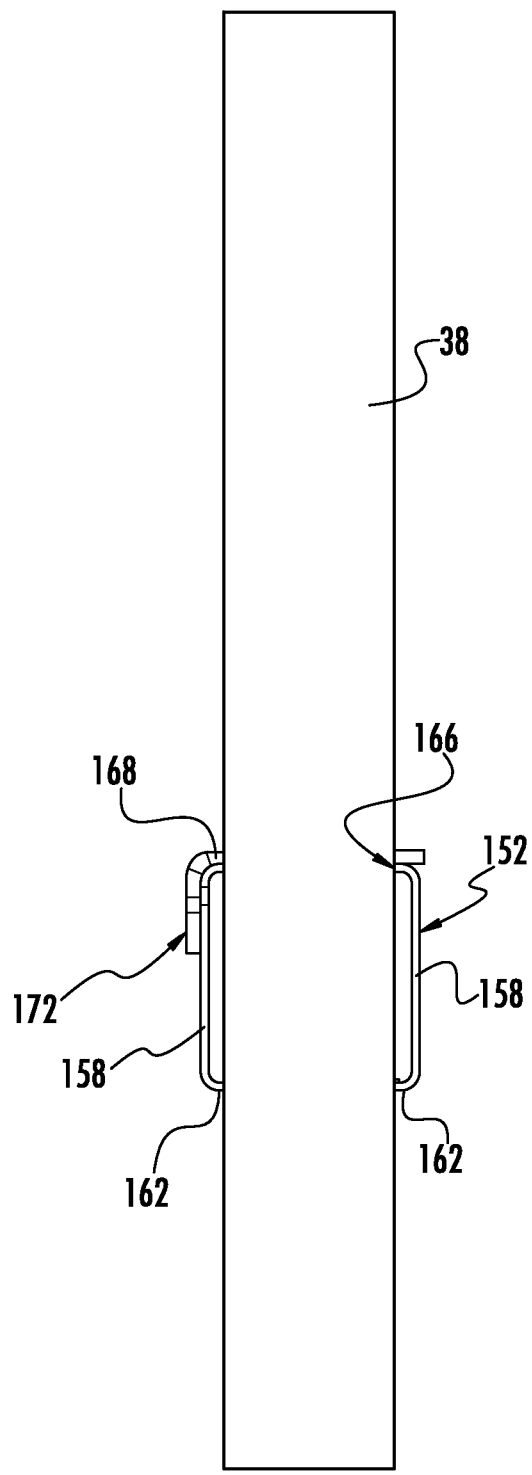
FIG. 16 is a cross-sectional view taken along line 16-16 of FIG. 15.
Figure 17:
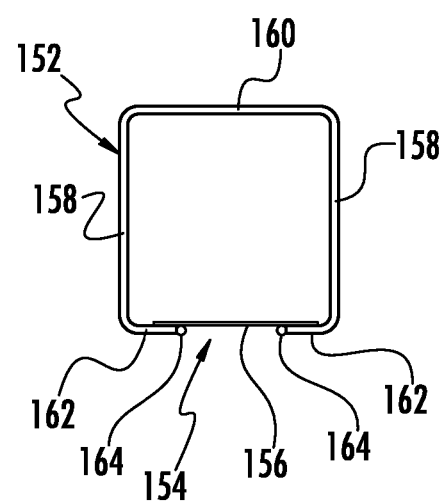
FIG. 17 is a cross-sectional view taken along line 17-17 of FIG. 15.

A hole 166 is provided in the top wall 160 of the rectangular component 152 and the jack tube 38 extends therethrough and also through the longitudinal opening 154 as best seen in FIG. 16. Jack tube 38 includes a triangular mounting plate 168 with bolt holes 170 extending therethrough adjacent each of the triangle corners. One corner 172 of the triangular plate 168 is bent and extends perpendicular therefrom for thereby placing the bent corner 172 and the bolt hole 170 thereof adjacent one of the sidewalls 158 of the rectangular component 152. The other corners of the triangular mounting plate 168 and bolt holes 170 thereat are thereby located adjacent the top wall 160 of the rectangular component 152. The jack tube 38 is thereby secured to the tongue 34 with two bolts (not shown) each of which extend through a bolt hole 170 and through the top wall 160 of the rectangular component 152, and one bolt (not shown) which extends through the bolt hole 170 of the bent corner 172 and through the sidewall 158 of the rectangular component 152. It is noted that the ball hitch coupling assembly 36 is also secured to the tongue 34 with bolts (not shown) which extend through holes 174 therethrough and aligned holes (not shown) which extend through the sidewalls 158 of the rectangular component 152.

The tongue 34 is pivotally secured to a trailer tongue pocket 176 which is, in turn, secured to the trailer frame 12. Pocket 176, in cross-section, is generally top hat shaped and comprises a top wall 178, sidewalls 180 integrally formed with and extending therefrom and brim portions 182 integrally formed with and extending perpendicular from the ends of the sidewalls 180. At each of its terminal ends, pocket 176 is provided with tabs 184 which are integrally formed with and extend perpendicularly upwardly from the top wall 178. Pocket 176 is provided with front holes 186 and rear holes 188 which extend through the sidewalls 180.

Figure 13:
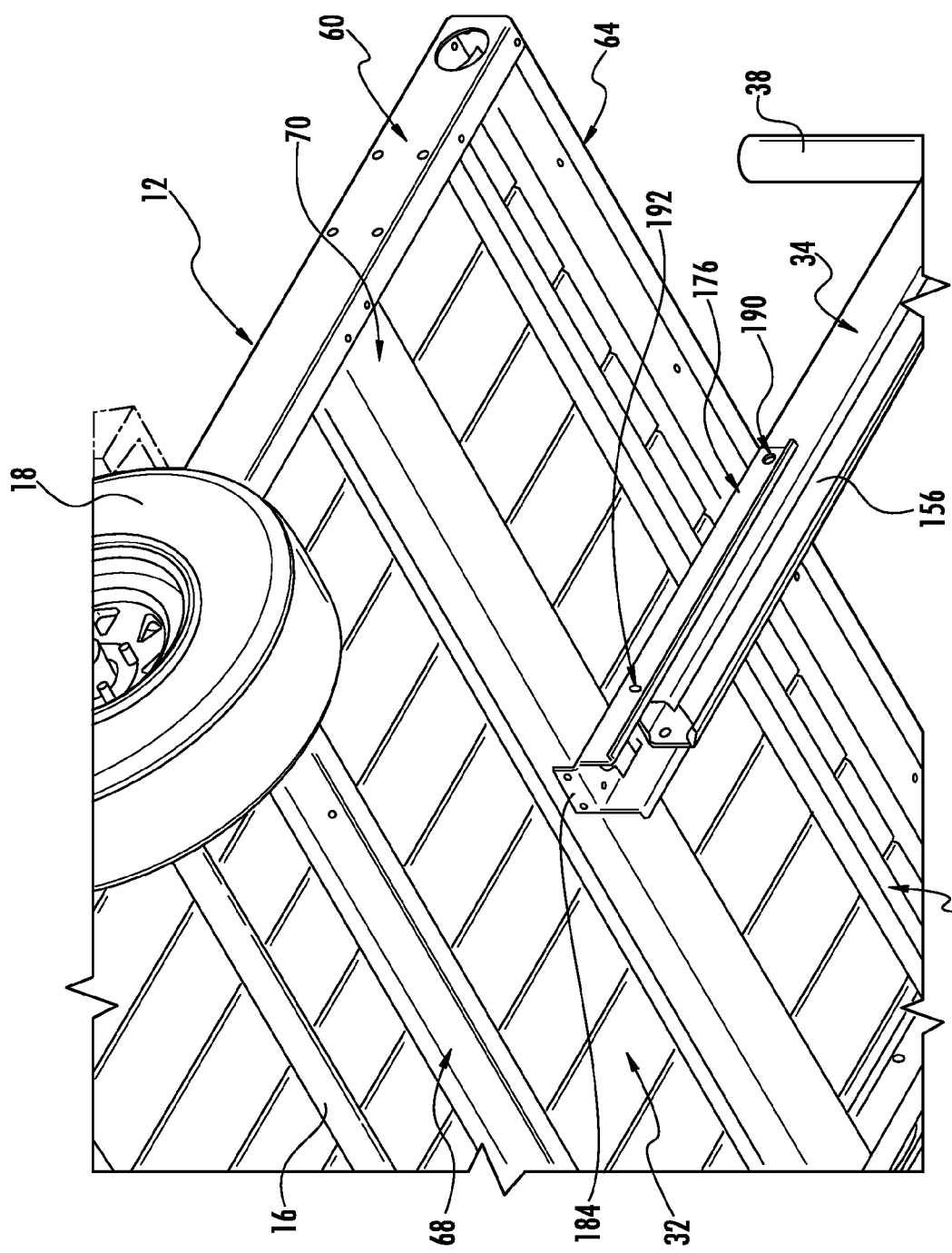
FIG. 13 is a partial perspective view of the trailer frame shown in FIG. 2 and showing the attachment of the trailer tongue thereto.
Figure 14:
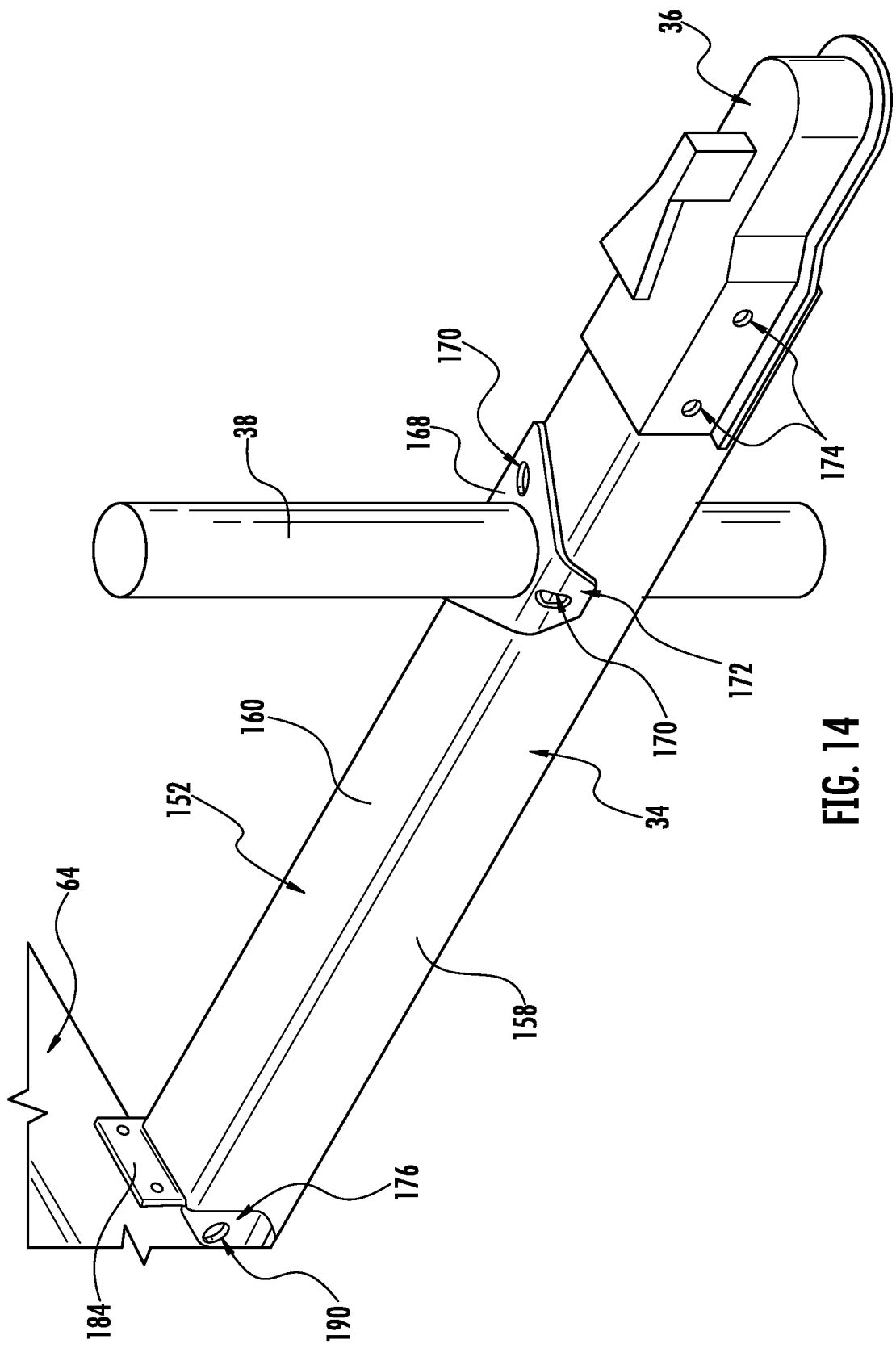
FIG. 14 is an enlarged perspective view of the trailer tongue and A-frame jack tube shown in FIG. 1.
Figure 15:
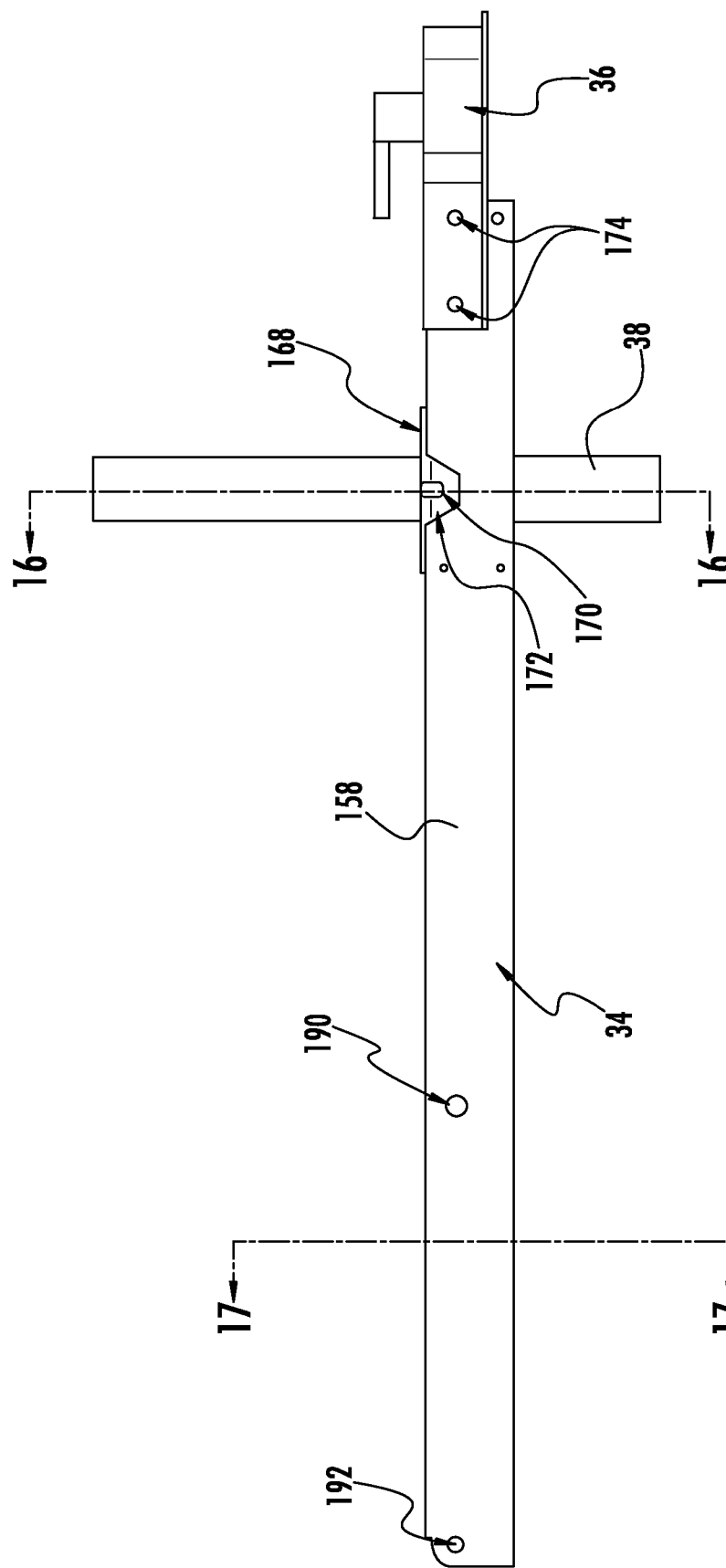
FIG. 15 is a side elevation view of the trailer tongue and A-frame jack shown in FIG. 14.

The rear portion of the tongue 34 is received within the tongue pocket 176 in a nested towing position as best seen in FIG. 13. In the nested towing position, holes 190 extending through the sidewalls 158 of the tongue 34 are aligned with the front holes 186 of the tongue pocket 176 and a removable pin (not shown) is provided extending therethrough. Also, holes 192 extending through the sidewalls 158 near the rear terminal end of tongue 34 are aligned with the rear holes 188 of the tongue pocket 176 and a bolt (not shown) is provided extending therethrough. As should now be appreciated to one skilled in the art, the removable pin can selectively be removed from the aligned holes 186, 194 thereby allowing the tongue 34 to pivot about the bolt extending through holes 188, 192 and, while tongue 34 remains generally horizontal, allow the trailer frame 12 to also pivot about the axle 16 and thereby place the trailer 10 in a tilted position at an angle from the horizontal. In the tilted position, the rear end structural member 66 is in contact with the ground whereby, for example, vehicles such as all-terrain vehicles (ATVs) and lawn tractors can be driven onto or off the trailer bed 32 and/or items on the trailer bed 32 can be dumped off therefrom. In the tilted position, the toe panel 124 and bottom side panel sections 130 of the rear end member 66 are placed generally horizontal and in contact with the ground.

Figure 18:
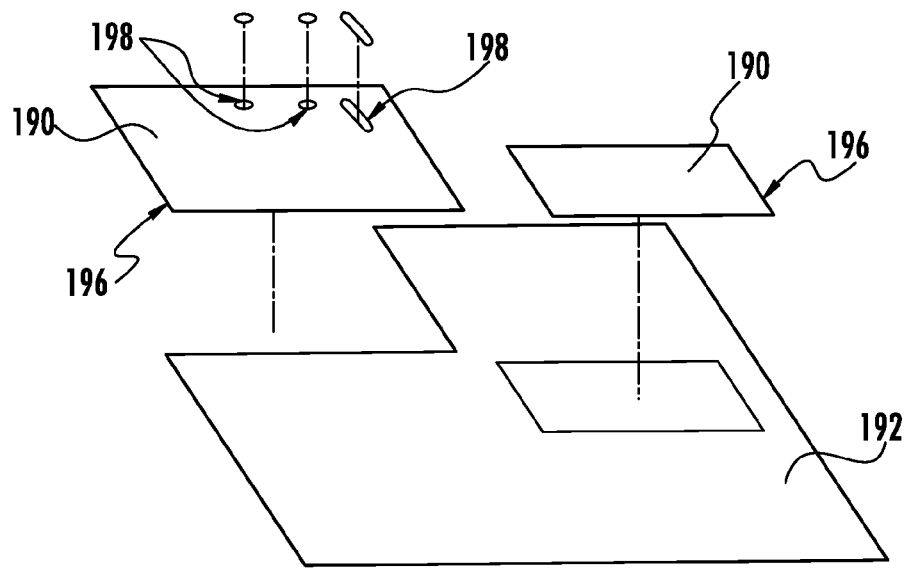
FIG. 18 is a diagrammatic view depicting the cutting of large metal sheets to desired shapes for use in forming trailer structural components/members.
Figure 19:
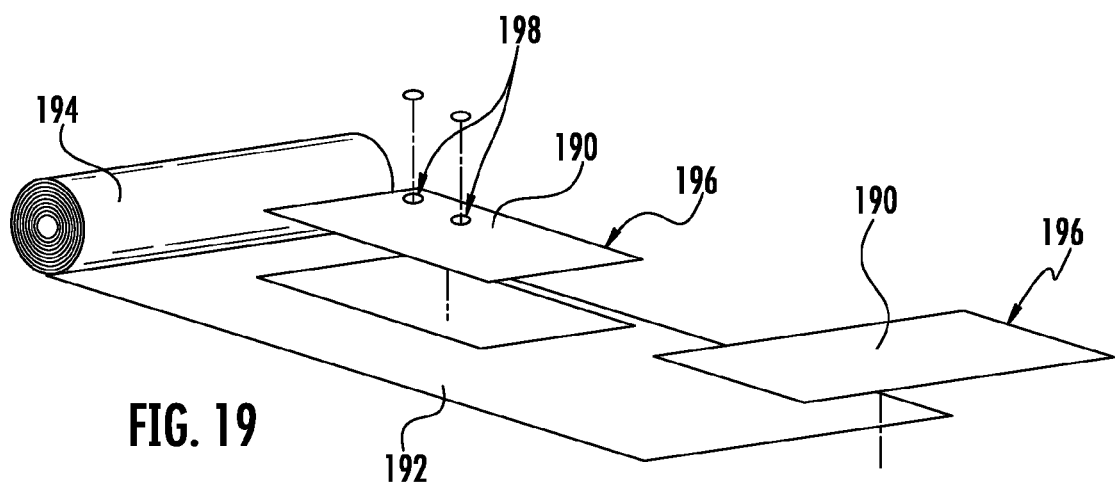
FIG. 19 is a diagrammatic view depicting the cutting of a large metal sheet provided in a roll to desired shapes for use in forming trailer structural components/members.

As mentioned hereinabove, in accordance with the principles of the present invention, the several structural components/members, including components/members 34, 42, 44, 46, 48, 50, 54, 58, 60, 62, 64, 66, 68, 70 and 176 are made of sheet metal and are then assembled for making the trailer 10. More particularly, the several structural components/members are made by cutting desired shapes which are diagrammatically indicated in FIGS. 18 and 19 with the numeral 190 from larger sheets of metal 192 and/or larger sheets of metal 192 provided on a roll. Sheet metal sheets 192 and rolls 194 are made of steel and are provided with a protective coating against rust on both sides thereof. Preferably, the protective coatings are galvanized coatings of zinc, aluminum or a combination of zinc and aluminum. The desired shapes 190, after cutting, are therefore also galvanized on both sides thereof. The sheet metal sheets 192 and rolls 194 will typically be 10 to 16 gauge in thickness and, most preferably, will be 12 to 14 gauge in thickness. Preferably, the desired shapes 190 are cut from the sheet metal sheets 192 by laser cutting, although other cutting methods such as shearing or punch pressing may be employed as well. Preferably, when cutting the desired shapes 190 from sheets 192, fastening holes and other holes and openings diagrammatically depicted by the numeral 198 are also cut or punched through the desired shapes 190. It is noted that, after cutting, the sheet metal underlying steel at the cut edges 196 is exposed and subject to rust. However, any such rusting will be quite slow and will not markedly affect the structural strength and appearance of the several components/members during the anticipated life of the trailer 10.

The desired shapes 190, as can be appreciated by one skilled in the art, have a perimeter edge 196 outline having a desired shape, e.g., width, length, etc., whereby the several components/members can be made by further bending and shaping. For example, as shown in FIG. 20, the desired shape 190 is bent as indicated "down 90°" and "up 90°" at the bend lines between the central web section 106 and the flange sections 108 for thereby forming a cross beam member 68. Also by way of example, as shown in FIG. 21, the desired shape 190 is bent as indicated for thereby forming a right side structural member 62. Also as indicated in both FIGS. 20 and 21, the several fastening holes and openings 198 that were cut or punched in the desired shapes 190 form the fastening holes and other openings whereby the several components/members can be assembled by aligning such fastening holes and openings as needed and securing the several components/members to one another with fasteners inserted therethrough. Preferably, the several components/members are assembled using rivets 200 and, more preferably, using blind rivets. It is noted that throughout the several views of the drawings the components/members, whether assembled to one another or not, for clarity purposes, are shown and depicted only with their fastening holes and openings 198 and without the fastening rivets 200.

Referring now again to FIGS. 3-12, it can be seen that the frame 12 is assembled by securing the crossbeam members 68 transversely between the left and right side structural members 60, 62. In this regard, the terminal ends 88 of crossbeam members 68 are inserted into the left and right side structural members 60, 62 placing their upper flange 108 adjacent the attachment leg 100 and their lower flange 108 adjacent the attachment leg 94. At each crossbeam terminal end 88 the upper flange 108 thereof is attached to the attachment leg 100 with one or more rivets 200 and the lower flange 108 is attached to the attachment leg 94 with one or more rivets 200 (see example thereof in FIG. 7).

The torque tube 70 is attached to the left and right side structural members 60, 62 similar to the crossbeam members 68. The torque tube terminal ends 90 are inserted into the left and right side structural members 60, 62. The terminal ends of the torque tube brim extensions 142 are thereby placed adjacent and secured to the attachment legs 100 with one or more rivets 200. Also, the terminal ends of the torque tube base section 140 are thereby placed adjacent and secured to the attachment legs 94 with one or more rivets 200 (see example thereof in FIG. 7).

Figure 12:
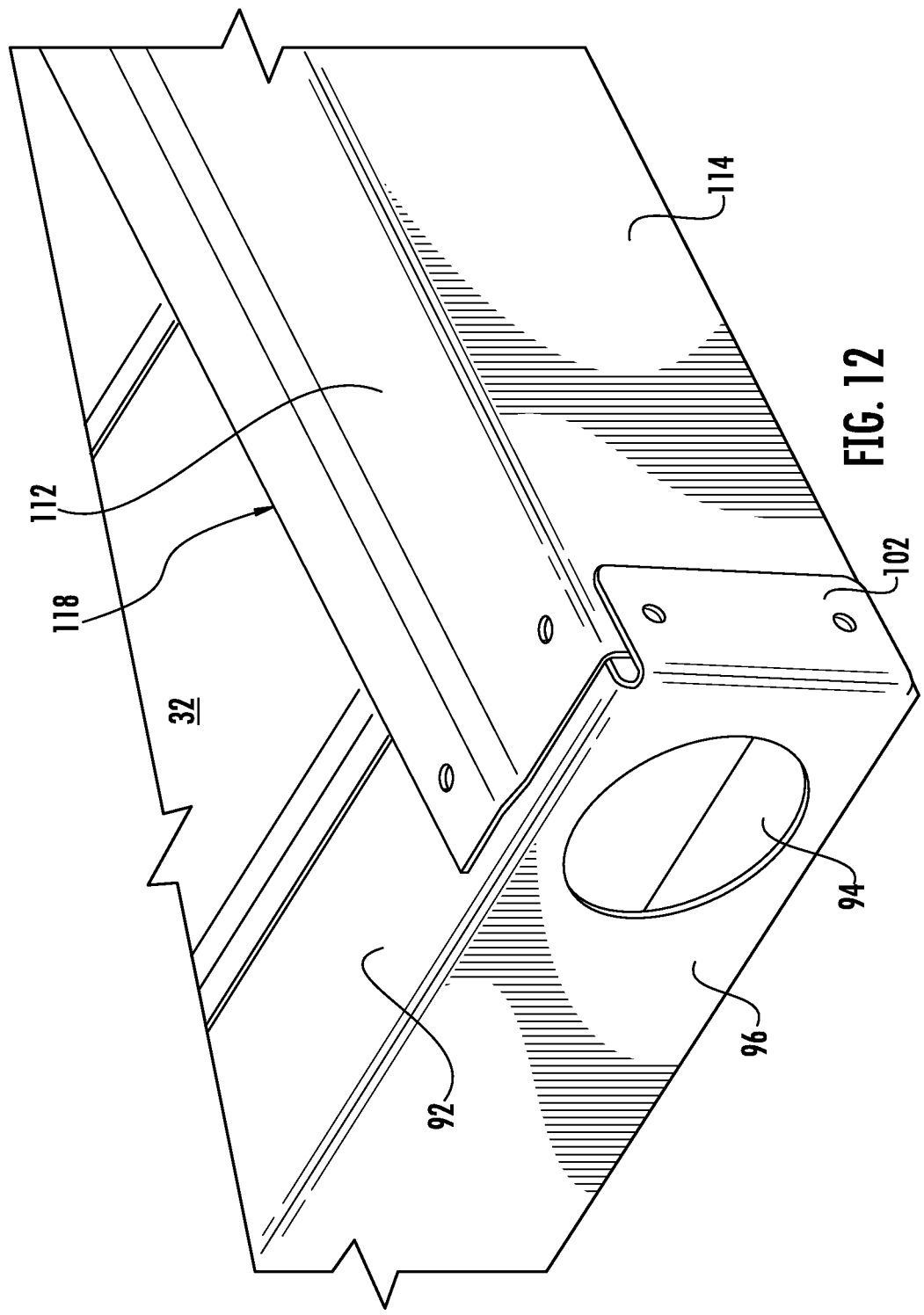
FIG. 12 is a partial perspective view of the side beam and front beam components similar to FIG. 11 but shown after assembly.

The left and right terminal ends 72, 74 of the front end structural member 64 are secured to the respective front terminal ends 76, 78 of the left and right side structural members 60, 62 as best shown in FIGS. 11 and 12. Here, the branch legs 92 are placed adjacent to and overlapping with the upper leg 112 and secured to one another with one or more rivets 200 (not shown). The tabs 102 are placed adjacent to and overlapping with the base section 114 and secured together with one or more rivets 200 (not shown). Also, the attachment legs 94 are placed adjacent to and overlapping with the lower leg 110 and secured together with one or more rivets 200 (not shown). As shown in FIG. 7 the trailer bed 32 rests on and is secured with screws (not shown) to the crossbeam members 68 and the torque tube 70. The trailer bed 32 also extends beyond the terminal edge 118 and under the interior section 116 of the front end structural member 64 thereby providing a generally smooth transition between the upper surface of the trailer bed and the upper surface of the upper leg 112 of the front end structural member 64.

The left and right terminal ends 80, 82 of the rear end structural member 66 are secured to respective rear terminal ends 84, 86 of the left and right side structural members 60, 62 as shown in FIGS. 3-6 and 10. In this regard, the bottom side panel sections 130 are placed adjacent to and overlapping with the upwardly bent elements 104 and are secured together with one or more rivets 200 (not shown). The side panels 128 are placed adjacent to and overlapping with the base section 96 and are secured together with one or more rivets 200 (not shown). Also, the upper panel 122 is placed adjacent to and overlapping with the branch leg 92 and is secured thereat with one or more rivets 200 (not shown). As best seen in FIG. 10, the trailer bed 32 extends over the crossbeam member 68 located close to the rear terminal ends 84, 86 of the left and right side members 60, 62 and under and adjacent to the upper panel 122 of the rear member 66. Screws 202 extend through and secure together the upper panel 122, the trailer bed 32 and the flange 108 of the cross beam member 68.

The tongue pocket 176 is secured to the frame 12 with its top wall 178 located adjacent to the base section 140 of the torque tube 70 and the lower leg 110 of the front end structural member 64. In this position, the tongue pocket rear tab 184 is adjacent and secured to the second leg 138 of the torque tube 70, and the tongue pocket front tab 184 is adjacent and secured to the base section 114 of the front end structural member 64.

Figure 6:
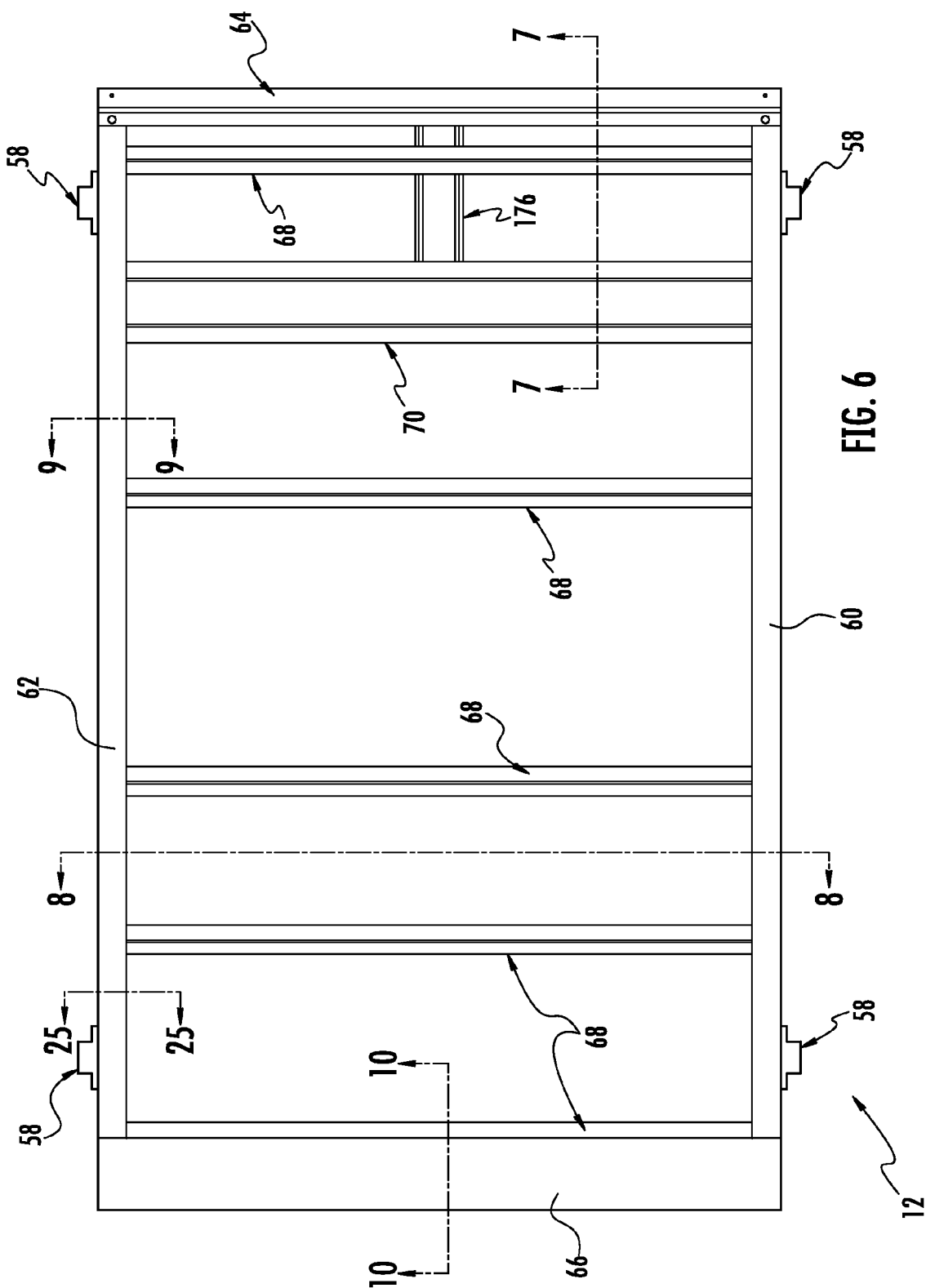
FIG. 6 is a top plan view of the trailer frame shown in FIG. 2.

As mentioned hereinabove, combination stake pockets and strap securement members 58 are provided and are secured to the frame 12. Typically, securement members 58 are attached to the left and right side members 60, 62 as shown in FIG. 6, although it is contemplated that they can also be provided and attached to the front end member 64 and rear end member 66. The stake pockets and strap securement members 58 can also be provided and secured on other land vehicles such as flatbed trucks. It is noted that, although the combination stake pockets and strap securement members 58 are described herein for use along the perimeter of a trailer bed/cargo bed 32, it should be understood that the invention is not so limited and that the stake pocket and securement members 58 can also be used along the cargo bed perimeter of other land vehicles such as, for example, flatbed trucks.

Sidewall supporting members such as 2×4 wood members or other similar sidewall supporting members made of other materials and dimensions (not shown) are received in and are vertically supported by the securement members 58 in a known and customary manner. Similar to the sidewall supporting frame members 54, the 2×4 wood members and/or such other sidewall supporting members are typically used, in a known and customary manner, for supporting the cargo bed sidewalls (not shown) as may be needed or desired.

Figure 24:
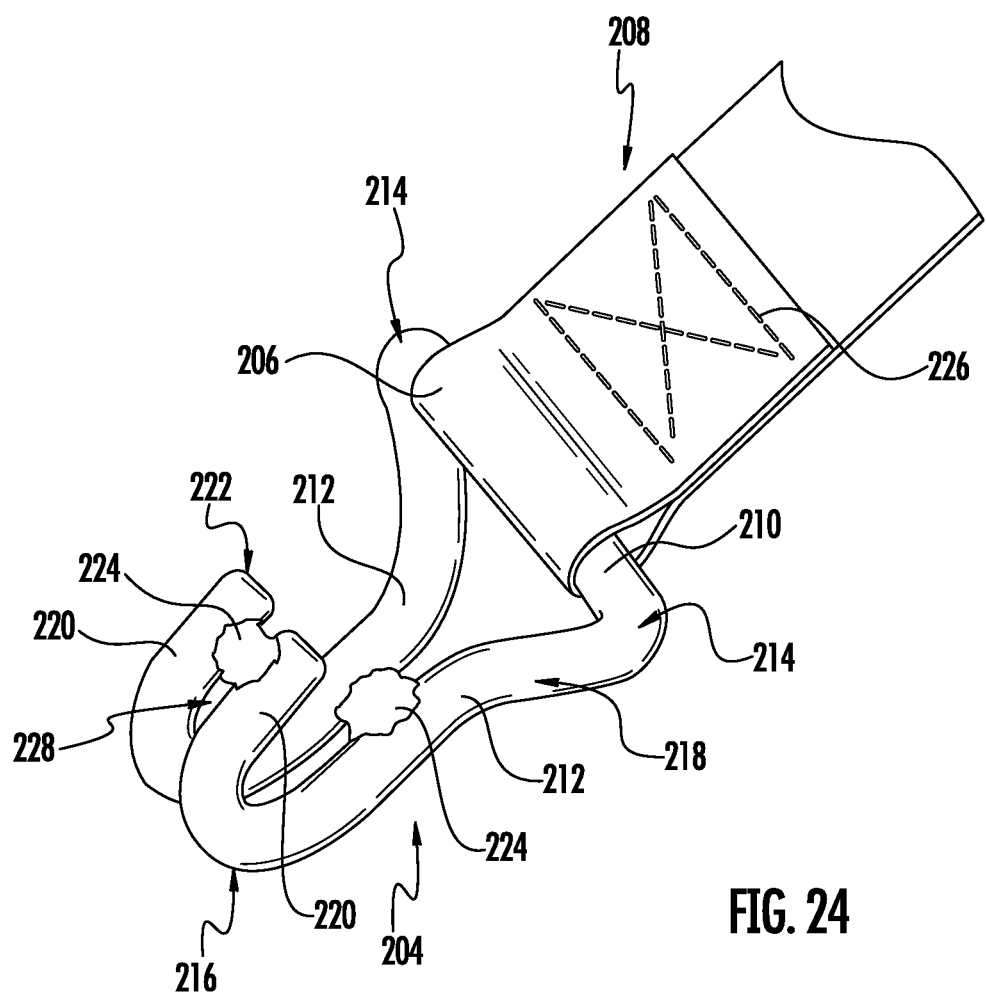
FIG. 24 is a perspective view of a common strap and double J-hook at its terminal end.

Referring now more particularly to FIGS. 22-27, the stake pockets and strap securement members 58, in accordance with the principles of the present invention, include means for selectively attaching thereto common cargo J-hooks such as, for example, as shown in FIG. 24, a double J-hook 204 which is attached at a terminal end 206 of a cargo strap 208.

As shown in FIG. 24, J-hook 204 is made by bending steel rod into a shape including a strap arm 210. Legs 212 extend from the terminal ends 214 of the strap arm 210 and are united to one another at the bend 216 thereby forming a Y-shaped back wall or shank 218. Fingers 220 are united/adjacent one another and extend from a bend 216 to a point or terminal end 222. Legs 212 can be joined to one another and fingers 220 can be joined to one another as shown by welding 224 or other suitable means for added strength in a known and customary manner. The exterior surfaces of the J-hook 204 are typically treated with a protective coating for preventing rust.

Cargo strap 208 is made of nylon or other suitable materials and is typically secured to or is adapted to be secured to a ratchet strap (not shown) for tensioning the strap and securing cargo to the trailer in a known and customary manner. As shown in FIG. 24, cargo strap 208 extends around the strap arm 210 and is secured onto itself with stitching 226 or other suitable means. Accordingly, cargo strap 208 is pivotally securely attached to the J-hook 204.

Figure 26:
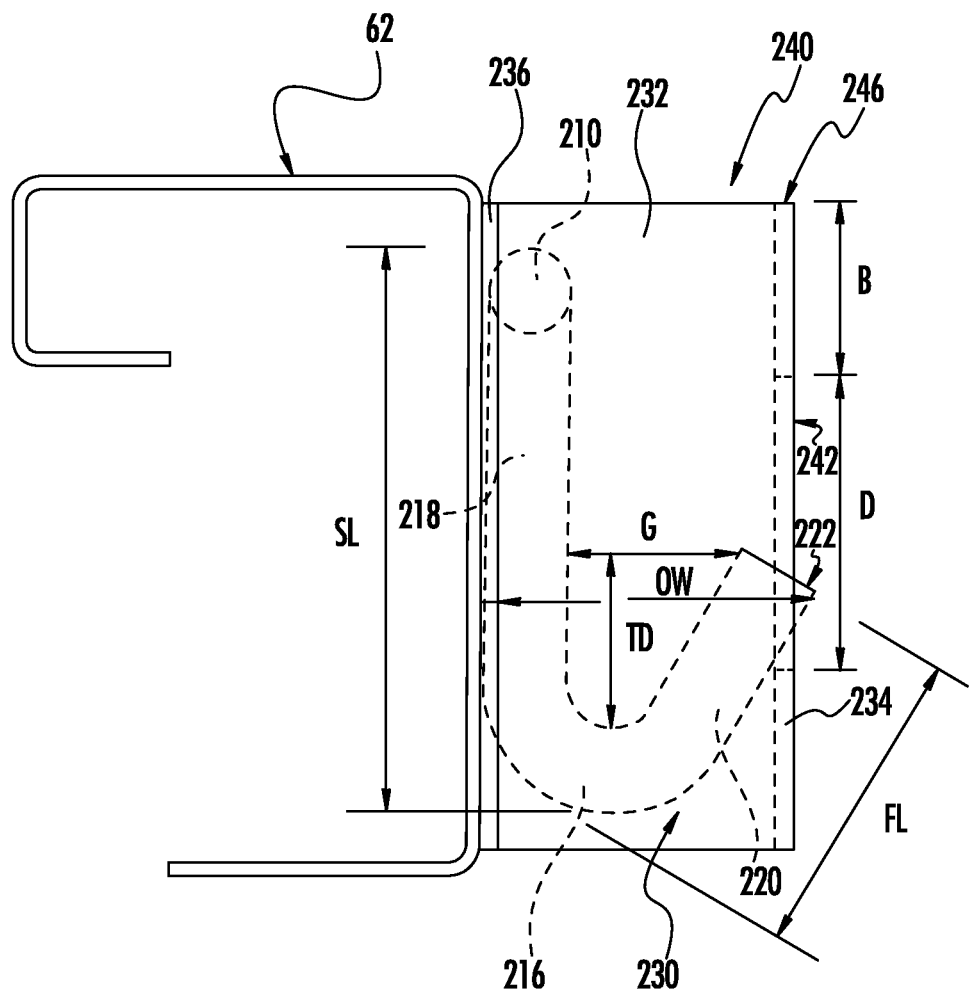
FIG. 26 is a cross-sectional view similar to FIG. 25 showing the double J-hook resting in the stake pocket formation such as when the strap is not in tension; and, FIG. 27 is a cross-sectional view similar to FIG. 25 showing the double J-hook in its in use position with its terminal end extending through the end wall opening and being effectively hooked onto the end wall of the stake pocket formation.

The steel rod forming the J-hook is about 7/16 inch diameter. Accordingly, when fingers 220 are placed adjacent one another, the width W of the terminal end 222 is about 7/8 inch plus any gap 228 that may be provided therebetween. Also, as best seen in FIG. 26, the fingers length FL is about 1 5/8 inch; the shank length SL is about 2 15/16 inch; the throat depth TD is about 7/8 inch; and, the gap G between the shank 218 and fingers 220 is about 15/16 inch.

The stake pockets and strap securement members 58 comprise stake pocket formations generally designated by the numeral 230. Stake pocket formations 230 include sidewalls 232, an end wall 234 extending generally perpendicular to and between the sidewalls 232 and attachment walls 236 extending generally perpendicular to the sidewalls 232 and in a direction away from the end wall 234. Essentially, sidewalls 232 and end wall 234 form a U-shape and, with the attachment walls 236, form a top hat shape. Fastener holes 238 are provided through the attachment walls 236. Bolts, rivets or other suitable fasteners (not shown) extend through the fastener holes 238 and into the frame 12 for securing the stake pocket formation 230 thereto. Stake pocket formation 230 can also be secured to the frame 12 by welding the attachment walls 236 to the frame 12, and/or by welding the sidewalls 232 themselves directly to the frame 12. Accordingly, with the stake pocket formation secured to the frame 12 as described and shown, the sidewalls 232 project generally perpendicular from the frame 12.

Preferably, the attachment walls 236, sidewalls 232 and the end wall 234 are integrally formed from a single sheet of steel by bending and creating the formation 230 as shown. Also preferably, the thickness of the steel sheet will typically be 10 to 16 gauge and, most preferably, will be 12 to 14 gauge, although it is contemplated that much thicker steel could also be used as may be needed or desired. The steel sheets are also provided with a protective coating against rust on both sides thereof similar to the other trailer components as described hereinabove.

Figure 22:
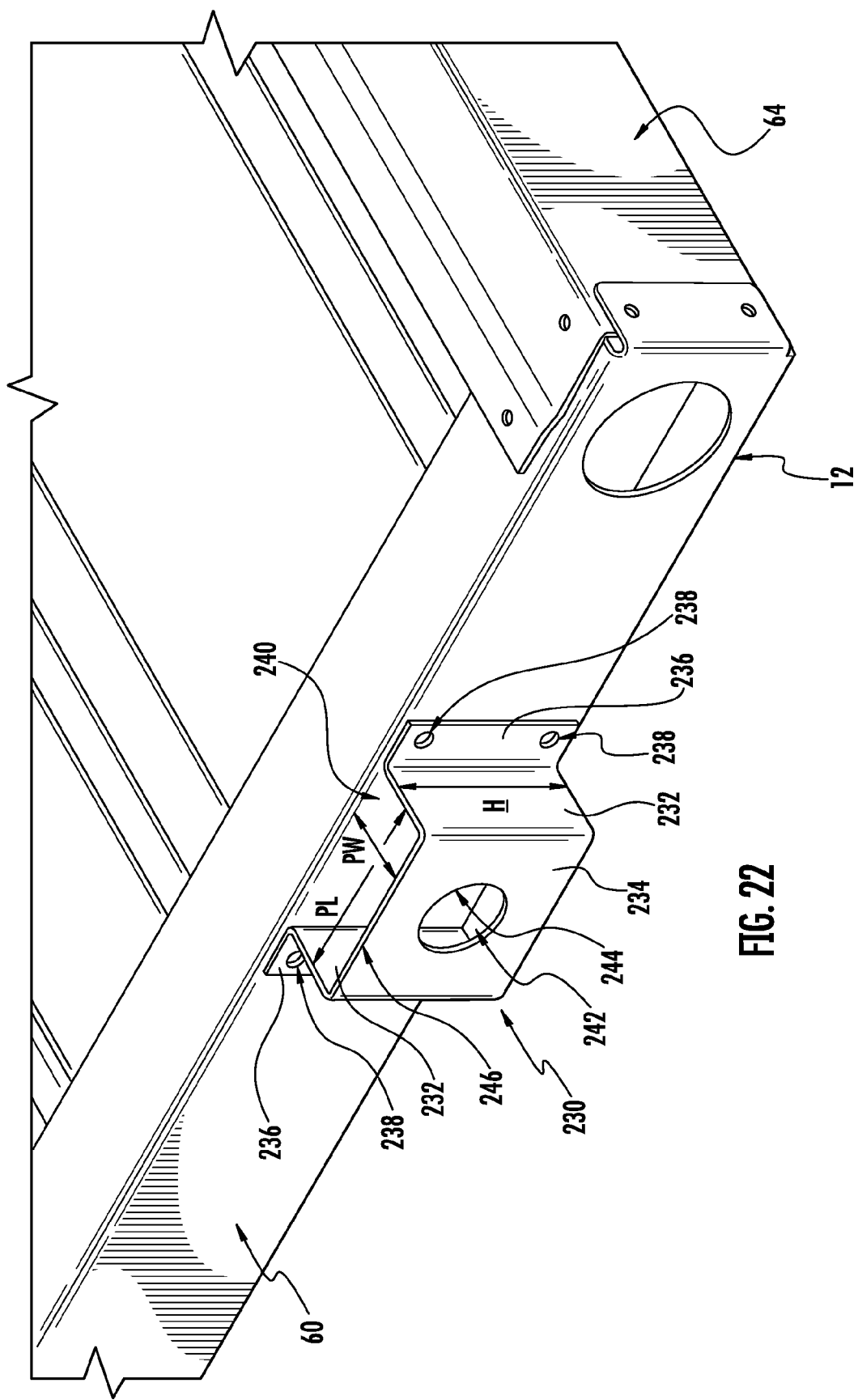
FIG. 22 is an enlarged view of the front left corner of the trailer frame shown in FIG. 2 depicting a stake pocket formation constructed in accordance with the principles of the present invention.
Figure 23:
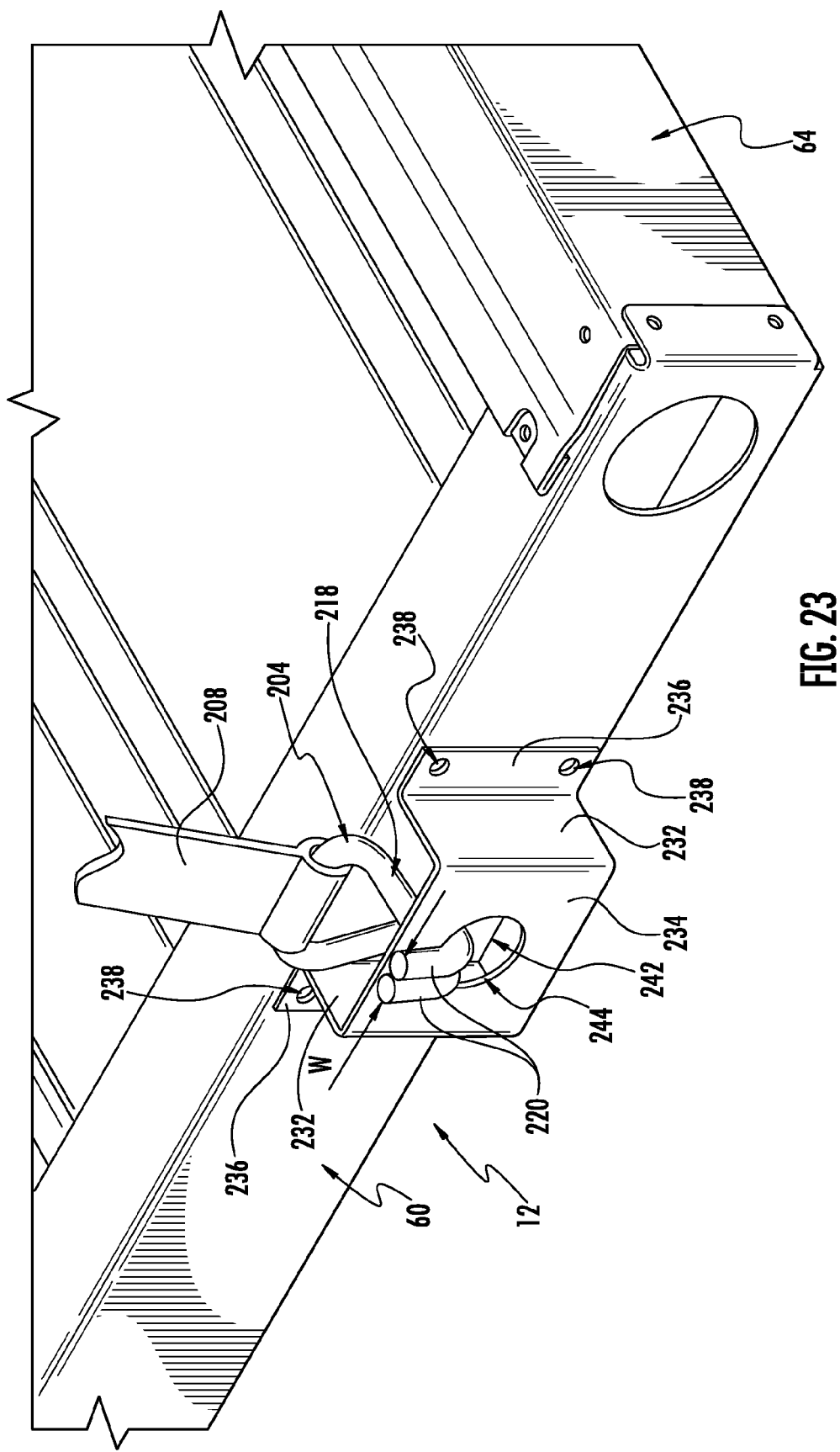
FIG. 23 is a perspective view similar to FIG. 22 and depicting a double J-hook at a terminal end of a strap secured to the stake pocket formation.

As best seen in FIG. 22, the attachment walls 236, sidewalls 232 and end wall 234 have a height H of about 3.5 inches. The pocket length PL between the sidewalls 232 is slightly greater than 3.5 inches, and the pocket width PW between the trailer frame 12 and the end wall 234 is slightly greater than 1.5 inch. Accordingly, the stake pocket formation 230 forms a stake pocket 240 which is rectangular shaped and is slightly greater than about 1.5 inch by about 3.5 inches wherein a standard 2×4 wood member can be slidingly received.

An opening 242 extends through the end wall 234 and is adapted to receive therethrough the terminal end 222 and fingers 220 of the J-hook 204. Opening 242 is defined by side edges 244 which are preferably separated by a distance of 1.2 to 2.0 inches. Most preferably, opening 242 is circular shaped (the side edges 244 form a circular shape) as shown having a diameter D of about 1.6 inch.

Opening 242 is generally centrally located between the sidewalls 232. Opening 242 is also located below an upper edge 246 of the end wall 234 a distance B which is preferably 0.6 to 1.4 inch and, most preferably, about 1.0 inch. That is, the side edges 244 of the opening 242 are located at least 0.6 to 1.4 inch below the upper edge 246 and, most preferably, the side edges 244 are located about 1 inch below the upper edge 246.

Figure 25:
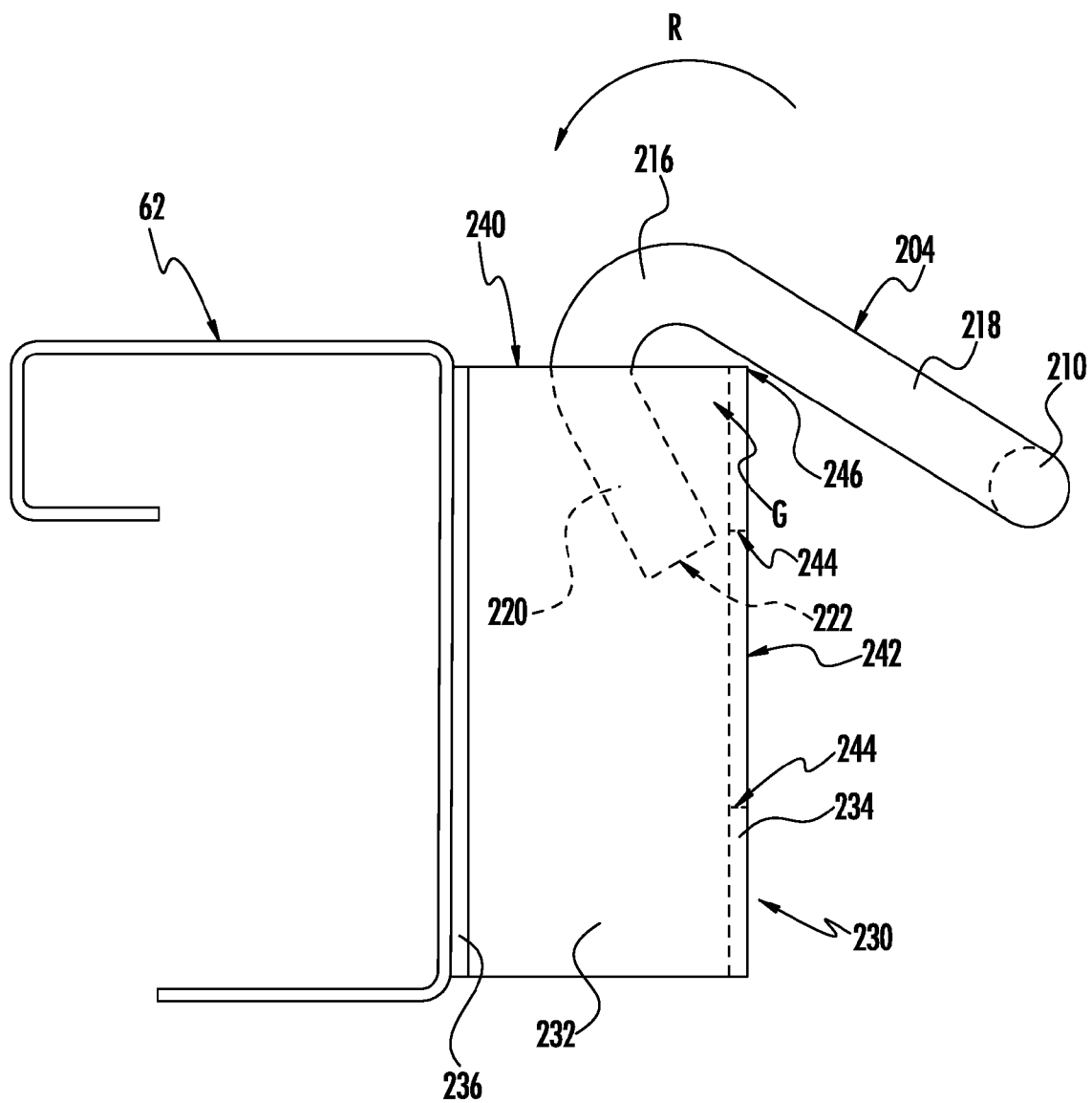
FIG. 25 is a cross-sectional view taken along line 25-25 of FIG. 6 and showing a double J-hook being placed into the stake pocket with the double J-hook terminal end extending into the stake pocket and just prior to being inserted into the formation end wall opening.
Figure 27:
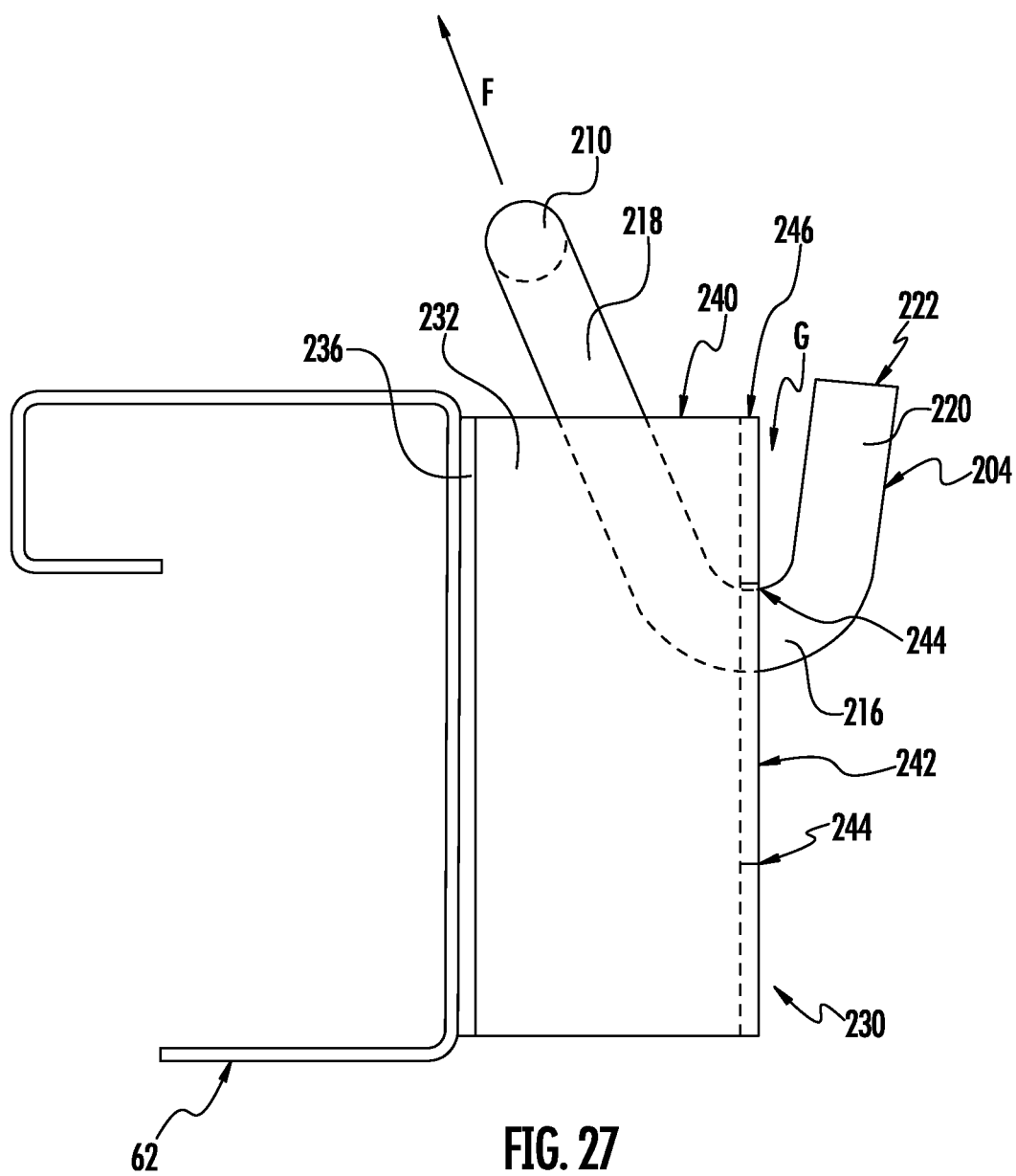

Referring now more particularly to FIGS. 25-27 wherein the use of the stake pocket formation 230 is depicted, a J-hook 204 is shown, for clarity purposes, without the cargo strap 208. For securing the J-hook 204 to the formation 230, as shown in FIG. 25, the fingers 220 and terminal end 222 thereof are first inserted into the stake pocket 240 by placing the end wall upper edge 246 in the gap G between the shank 218 and the fingers 220. By further rolling/turning the J-hook 204 as indicated by arrow R, the fingers 220 and terminal end 222 thereof are inserted into and through the opening 242 as shown in FIG. 27. As can be appreciated, in the position shown in FIG. 27 the cargo strap 208 can be tightened/placed in tension such that the J-hook 204 is pulled in a direction as indicated by arrow F. With the cargo strap 208 in tension, the end wall 234 above the side edges 244 is received within the gap G of the J-hook 204 with the side edge 244 abutting the bend 216 of the J-hook 204. As should now also be appreciated, so long as the cargo strap 208 remains in tension, the J-hook 204 is securely retained in the position as shown in FIG. 27.

It has been found that the distance B relative to the J-hook gap G and throat depth TD must be coordinated and sized as described hereinabove so that, as the J-hook 204 is rolled into the stake pocket 240 as indicated by arrow R, the terminal end 222 thereof will be received through the opening 242. If the distance B is too large relative to the J-hook gap G and throat depth TD, the terminal end 222 will hit the end wall 234 rather than the opening 242. On the other hand, if the distance B is too small, the strength thereof may be insufficient for withstanding the force exerted thereon by the J-hook.

Also advantageously, while the cargo strap 208 is placed over and/or around cargo on the trailer or the cargo strap 208 is otherwise not in tension, the J-hook 204 which has been placed into the stake pocket 240 will not fall therethrough but, rather, will fall into and will be maintained in the position as shown in FIG. 26. That is, without a tension force F, the J-hook 204 is gravitationally pulled downwardly into the stake pocket 240 until the shank 218 abuts the trailer frame 12 and the fingers 220 abut the side edges 244 of the opening 242. In this regard, it has been found that the J-hook steel rod diameter, gap G and pocket width PW must be coordinated so that, without a tension force F, the shank 218 will abut the trailer frame 12 and the fingers 220 will abut the side edges 244 of the opening 242. More particularly, the overall width OW of the J-hook, which is about two times the rod diameter plus the gap G distance, is coordinated to be greater than the pocket width PW.

Finally, as should now also be appreciated, the J-hook cannot be removed from the stake pocket 240 by merely pulling the strap 208 thereof vertically upwardly. Rather, for removing the J-hook from the stake pocket 240, the J-hook must be rolled in the opposite direction of arrow R around and over the end wall upper edge 246.

While this invention has been described as having an exemplary design, the present invention may be further modified within the spirit and scope of this disclosure. This application is therefore intended to cover any variations, uses, or adaptations of the invention using its general principles.

What is claimed is:

1. In a combination comprising a cargo bed, a frame supporting said cargo bed and wheels rotatably secured to said frame, a plurality of stake pocket formations:
   wherein each formation includes a pocket adapted to receive a sidewall supporting member;
   wherein each said stake pocket formation includes a pair of sidewalls secured to and projecting from said frame and an end wall extending between said pair of sidewalls;
   an opening extending through each said formation end wall adapted to receive a terminal end of a J-hook therethrough, whereby a strap having the J-hook at its terminal end may be secured to said stake pocket formations; and,
   wherein an overall width of the J-hook is greater than a width of said pocket whereby, when a J-hook is located within said pocket and the J-hook strap is not in tension, at least a portion of a shank of the J-hook is located within said pocket and the terminal end of the J-hook abuts said opening whereby the J-hook is supported and maintained within said formation.

2. The combination of claim 1 wherein said opening is defined by side edges separated by a distance of 1.2 to 2.0 inches.

3. The combination of claim 1 wherein said end walls include an upper edge, and wherein said opening is located at least 0.6 to 1.4 inch below said end wall upper edge.

4. The combination of claim 1 wherein said end walls include an upper edge, said opening is defined by side edges separated by a distance of 1.2 to 2.0 inches, and wherein said opening side edges are located at least 0.6 to 1.4 inch below said end wall upper edge.

5. The combination of claim 4 wherein the J-hook is secured to said formation by inserting the terminal end thereof into said pocket placing said upper edge into a gap of the J-hook located between the J-hook shank and fingers and rolling the J-hook and inserting the terminal end thereof through said opening.

6. The combination of claim 4 wherein each stake pocket formation further includes an attachment wall extending from each of said sidewalls, said attachment walls being attached to said frame whereby said sidewalls are secured thereto.

7. The combination of claim 6 wherein said formation attachment walls, sidewalls and end wall are integrally formed with one another.

8. The combination of claim 1 wherein said formation sidewalls and end wall are integrally formed with one another.

9. The combination of claim 1 wherein each stake pocket formation further includes an attachment wall extending from each of said sidewalls, said attachment walls being attached to said frame whereby said sidewalls are secured thereto.

10. The combination of claim 9 wherein said formation attachment walls, sidewalls and end wall are integrally formed with one another.

11. The combination of claim 1 wherein said formation sidewalls project from said frame a distance slightly greater than about 1.5 inch and said end walls extend between said sidewalls a distance slightly greater than about 3.5 inches, whereby said stake pockets are rectangular and are slightly greater than about 1.5 inch by about 3.5 inches.

12. The combination of claim 11 wherein said end walls include an upper edge, said opening is defined by side edges separated by a distance of 1.2 to 2.0 inches, and wherein said opening side edges are located at least 0.6 to 1.4 inch below said end wall upper edge.

13. The combination of claim 12 wherein each stake pocket formation further includes an attachment wall extending from each of said sidewalls, said attachment walls being attached to said frame whereby said sidewalls are secured thereto.

14. The combination of claim 1 wherein said formation end wall includes an upper edge, and wherein a J-hook is secured to said formation by inserting the terminal end thereof into said pocket placing said upper edge into a gap of the J-hook located between the J-hook shank and fingers and rolling the J-hook and inserting the terminal end thereof through said opening.

15. A stake pocket formation attachable to a frame along a perimeter of a cargo bed for forming a stake pocket for receiving a sidewall supporting member, said stake pocket formation comprising:
   an end wall extending between a pair of sidewalls, said sidewalls being attachable to said frame for thereby forming a pocket for receiving a sidewall supporting member;

an opening extending through said end wall adapted to receive a terminal end of a J-hook therethrough, whereby a strap having the J-hook at its terminal end may be secured to said stake pocket formation; and, wherein an overall width of the J-hook is greater than a width of said pocket whereby, when a J-hook is located within said pocket and the J-hook strap is not in tension, at least a portion of shank of the J-hook is located within said pocket and the terminal end of the J-hook abuts said opening whereby the J-hook is supported and maintained within said formation.

16. The stake pocket formation of claim 15 wherein said opening is defined by side edges separated by a distance of 1.2 to 2.0 inches.

17. The stake pocket formation of claim wherein said end wall includes an upper edge, and wherein said opening is located at least 0.6 to 1.4 inch below said end wall upper edge.

18. The stake pocket formation of claim 15 wherein said end wall includes an upper edge, said opening is defined by side edges separated by a distance of 1.2 to 2.0 inches, and wherein said opening side edges are located at least 0.6 to 1.4 inch below said end wall upper edge.

19. The stake pocket formation of claim 18 wherein a J-hook is secured to said formation by inserting the terminal end thereof into said pocket placing said upper edge into a gap of the J-hook located between a J-hook shank and fingers and rolling the J-hook and inserting the terminal end thereof through said opening.

20. The stake pocket formation of claim 15 wherein an attachment wall extends from each of said sidewalls, said attachment walls including fastener holes adapted to receive a fastener for attaching said formation to said frame.

21. The stake pocket formation of claim 20 wherein said attachment walls, sidewalls and end wall are integrally formed with one another.

22. The stake pocket formation of claim 20 wherein said end wall includes an upper edge, said opening is defined by side edges separated by a distance of 1.2 to 2.0 inches, and wherein said opening side edges are located at least 0.6 to 1.4 inch below said end wall upper edge.

23. The stake pocket formation of claim 22 wherein said formation sidewalls extend between their respective attachment wall and said end wall a distance slightly greater than about 1.5 inch and said end wall extends between said sidewalls a distance slightly greater than about 3.5 inches, whereby the formed said stake pocket is rectangular and is slightly greater than about 1.5 inch by about 3.5 inches.

24. The stake pocket formation of claim 15 wherein said end wall includes an upper edge, and wherein the J-hook is secured to said formation by inserting the terminal end thereof into said pocket placing said upper edge into a gap of the J-hook located between the J-hook shank and fingers and rolling the J-hook and inserting the terminal end thereof through said opening.

25. The combination of claim 1 further wherein, when the J-hook is located within said pocket and the J-hook strap is not in tension, a shank of the J-hook abuts said frame.

26. The stake pocket formation of claim 15 further wherein, when the J-hook is located within said pocket and the J-hook strap is not in tension, a shank of the J-hook abuts said frame.

* * * * *

UNITED STATES PATENT AND TRADEMARK OFFICE
CERTIFICATE OF CORRECTION

PATENT NO. : 8,985,664 B2  
APPLICATION NO. : 13/928726  
DATED : March 24, 2015  
INVENTOR(S) : Steven P. Bermes Page 1 of 1

It is certified that error appears in the above-identified patent and that said Letters Patent is hereby corrected as shown below:

In the Claims

Column 13, line 15, change "claim" to --claim 15--

Signed and Sealed this
Second Day of June, 2015

Michelle K. Lee
*Director of the United States Patent and Trademark Office*